(12) United States Patent
Mistry et al.

(10) Patent No.: US 7,638,609 B2
(45) Date of Patent: *Dec. 29, 2009

(54) TRISAZO-DYESTUFFS

(75) Inventors: Prahalad Manibhai Mistry, Manchester (GB); Roy Bradbury, Manchester (GB)

(73) Assignee: Fujifilm Imaging Colorants Limited, Manchester (GB)

(*) Notice: Subject to any disclaimer, the term of this patent is extended or adjusted under 35 U.S.C. 154(b) by 535 days.

This patent is subject to a terminal disclaimer.

(21) Appl. No.: 10/579,783

(22) PCT Filed: Nov. 18, 2004

(86) PCT No.: PCT/GB2004/004868

§ 371 (c)(1),
(2), (4) Date: May 18, 2006

(87) PCT Pub. No.: WO2005/052065

PCT Pub. Date: Jun. 9, 2005

(65) Prior Publication Data

US 2007/0062409 A1    Mar. 22, 2007

(30) Foreign Application Priority Data

Nov. 20, 2003 (GB) ................................. 0326980.0
Nov. 20, 2003 (GB) ................................. 0326997.4

(51) Int. Cl.
*C09B 31/28* (2006.01)
*C09D 11/00* (2006.01)
(52) U.S. Cl. ..................................................... 534/551
(58) Field of Classification Search .................... None
See application file for complete search history.

(56) References Cited

U.S. PATENT DOCUMENTS

| | | | |
|---|---|---|---|
| 1,615,550 A | 1/1927 | Oesch | |
| 3,207,746 A * | 9/1965 | Andrew et al. | 534/625 |
| 7,041,161 B2 * | 5/2006 | Mistry et al. | 106/31.5 |
| 7,052,538 B2 | 5/2006 | Mistry et al. | 106/31.5 |
| 7,056,376 B2 | 6/2006 | Popat et al. | 106/31.5 |
| 2001/0027734 A1 | 10/2001 | Geisenberger et al. | 106/31.52 |
| 2009/0041939 A1 * | 2/2009 | Mistry | 427/256 |

FOREIGN PATENT DOCUMENTS

| | | |
|---|---|---|
| DE | 243122 | 2/1911 |
| DE | 469288 | 12/1928 |
| FR | 622974 | 6/1927 |
| FR | 815403 | 7/1937 |
| GB | 5955 | 1/1912 |
| GB | 259970 | 1/1928 |
| JP | 10 195320 | 7/1928 |
| JP | 2001 108828 | 4/2001 |
| SE | 217944 | 11/1941 |
| WO | WO 03/095562 | 11/2003 |

OTHER PUBLICATIONS

CA PLUS abstract of JP01135880 May 29, 1989.*

* cited by examiner

*Primary Examiner*—Daniel M Sullivan
*Assistant Examiner*—Yevegeny Valenrod
(74) *Attorney, Agent, or Firm*—Morgan Lewis Bockius LLP

(57) ABSTRACT

A compound of Formula (1) or salt thereof:

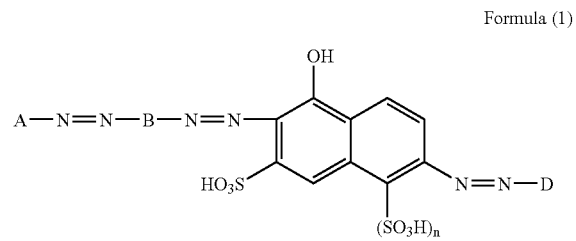

Formula (1)

wherein:
A is optionally substituted phenyl or naphthyl;
B is optionally substituted phenylene or naphthylene;
n is 0 or 1; and
D is a pyrazolyl group,
with the proviso that when A is an optionally substituted phenyl group and B is a phenylene group of Formula T,

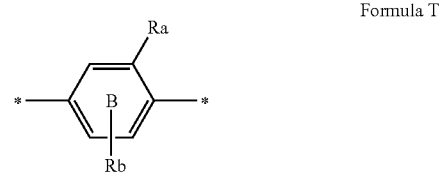

Formula T wherein
Ra is OH or a $C_{1-4}$-alkoxy group; and
Rb is H or a $C_{1-4}$-alkyl group, hydroxy group, $C_{1-4}$-alkoxy group, $C_{1-3}$-dialkyamino group or a group of the formula NHCORc (wherein Rc is $C_{1-3}$-alkyl or an amino group); and
* shows the point of attachment to the azo linkages on B in Formula (1);
A is free from nitro groups.

Also, claimed are compounds, compositions and ink-jet cartridges for use in an ink-jet printer and substrate printed with an ink-jet printer.

13 Claims, No Drawings

TRISAZO-DYESTUFFS

This invention relates to compounds suitable for use as dyes, to inks and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, ozone-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

JP10195320 describes dyes including tris-azo dyes carrying a pyrazolyl azo group and their use in the coloration of paper and pulp.

US patent application 2001/0027734 describes metal complexes of tris-azo dyes derived from tris-azo molecules optionally containing a (substituted) pyrazolylazo moiety. The copper complexes are said to be particularly preferred.

We have surprisingly found that certain non-metallised compounds provide valuable colorants for ink jet printing inks.

According to the present invention there is provided a compound of Formula (1) or salt thereof:

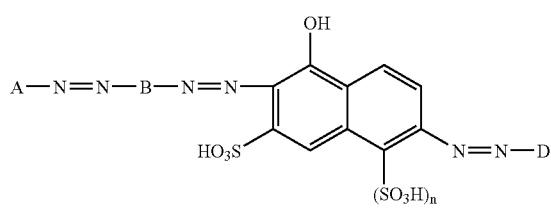

Formula (1)

wherein:
A is optionally substituted phenyl or naphthyl;
B is optionally substituted phenylene or naphthylene;
n is 0 or 1; and
D is a pyrazolyl group with the proviso that when A is an optionally substituted phenyl group and B is a phenylene group of Formula T,

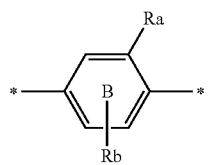

Formula T wherein
Ra is OH or a $C_{1-4}$-alkoxy group; and
Rb is H or a $C_{1-4}$-alkyl group, hydroxy group, $C_{1-4}$-alkoxy group, $C_{1-3}$-dialkyamino group or a group of the formula NHCORc, (wherein Rc is $C_{1-3}$-alkyl or an amino group); and

* shows the point of attachment to the azo linkages on B in Formula (1);
A is free from nitro groups.

The optional substituents which may be present on A or B are each independently preferably selected from hydroxy, halo, nitro, cyano, carboxy, sulpho, phosphato, optionally substituted amino (especially amino carrying one or more $C_{1-4}$-alkyl groups), optionally substituted acylamino (especially $C_{1-4}$acylamino or phenylacylamino, each of which optionally carries a sulpho or a carboxy group), optionally substituted ureido (especially ureido carrying one or two $C_{1-4}$-alkyl groups), optionally substituted $C_{1-6}$-alkyl, optionally substituted $C_{1-6}$-cycloalkyl, optionally substituted $C_{1-6}$-alkoxy, optionally substituted $C_{1-6}$-alkylthio, optionally substituted aryl, optionally substituted $C_{1-}$-alkyl sulphonyl and optionally substituted sulphonamido (especially sulphonamido carrying one or two $C_{1-4}$-alkyl groups).

When A is substituted phenyl or naphthyl the optional substituents on A are more preferably selected from nitro, carboxy, sulpho, phosphato, optionally substituted amino (especially amino carrying one or more $C_{1-4}$-alkyl groups), optionally substituted acylamino (especially $C_{1-4}$-acylamino or phenylacylamino, each of which optionally carries a sulpho or a carboxy group), optionally substituted ureido (especially ureido carrying one or two $C_{1-4}$-alkyl groups), optionally substituted $C_{1-6}$-alkyl, optionally substituted $C_{1-6}$-cycloalkyl, optionally substituted $C_{1-6}$-alkoxy and optionally substituted sulphonamido ($SO_2NR^6R^7$) (especially sulphonamido carrying one or two $C_{1-4}$-alkyl groups) and optionally substituted carbonamido ($CONR^6R^7$) wherein $R^6$ and $R^7$ are each independently H or optionally substituted $C_{1-6}$-alkyl.

When A is substituted phenyl or naphthyl the optional substituents on A are most preferably selected from nitro, carboxy, sulpho, phosphato, optionally substituted amino (especially amino carrying one or more $C_{1-4}$-alkyl groups), optionally substituted acylamino (especially $C_{1-4}$acylamino or phenylacylamino, each of which optionally carries a sulpho or a carboxy group), optionally substituted $C_{1-6}$-alkyl, optionally substituted $C_{1-6}$-cycloalkyl, and optionally substituted $C_{1-6}$-alkoxy. In addition, A preferably also carries at least one water-solubilising group selected from carboxy, sulpho and phosphato.

As examples of optionally substituted phenyl and naphthyl groups represented by A there may be mentioned 4-amino-2,5-disulphophenyl, 2-sulpho4-methoxyphenyl, 2-carboxy-4-sulphophenyl, 2-sulpho-4-methylphenyl, 2-methoxy-5-methyl-4-sulphophenyl and 2-sulpho-4,5-dimethylphenyl. However, it is also most preferred that A is optionally substituted phenyl group, most preferably substituted as described above.

When B is substituted phenylene or naphthylene the optional substituents on B are preferably selected from carboxy, sulpho, phosphato, optionally substituted amino, optionally substituted acylamino, optionally substituted ureido, optionally substituted alkyl, optionally substituted alkoxy and optionally substituted aryl.

When B is substituted phenylene the phenylene ring preferably carries one or more groups selected from optionally substituted $C_{1-6}$-alkyl, optionally substituted $C_{1-6}$-alkylthio, optionally substituted $C_{1-6}$-alkoxy, optionally substituted amino, optionally substituted ureido, carboxy arid sulpho.

When B is optionally substituted naphthylene the naphthylene ring preferably carries one or more water solubilising groups, more preferably one or two groups selected from carboxylic, sulphonic and phosphonic acid groups.

As examples of optionally substituted phenylene and naphthylene groups represented by B there may be mentioned 2,5-di(2-hydroxyethoxy)phen-1,4-ylene, 2,5-dimethoxyphen-1,4-ylene, 2,5diethoxyphen-1,4-ylene, 2-methoxy-5-aminophen-1,4-ylene, 2-methoxy-5-acetylaminophen-1,4-ylene, 7-sulphonaphth-1,4-ylene, 6-sulphonaphth-1,4-ylene and 2-ethoxy-6-sulphonaphth-1,4-ylene. However, it is most preferred that B is an optionally substituted phenylene group wherein the phenylene group is most preferably substituted as described above.

Preferably D is a pyrazolyl group carrying at least one carboxy, sulpho or phosphato group. More preferably D is a group of Formula (3a), (3b) or (3c), even more preferably D is of Formula (3a) or (3b) and most preferably D is of Formula (3a).

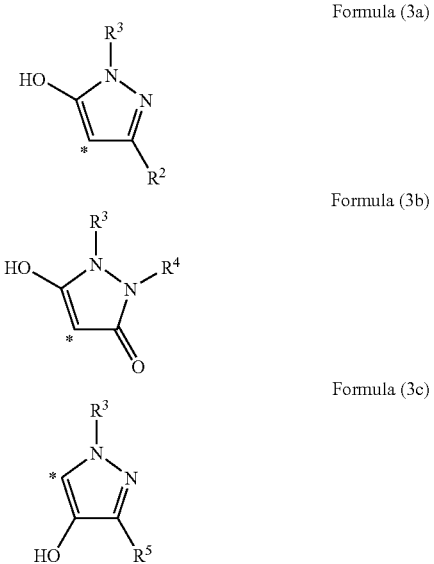

Formula (3a)

Formula (3b)

Formula (3c)

wherein $R^2$ and $R^5$ are each independently H, carboxy, cyano or optionally substituted $C_{1-6}$-alkyl, $C_{1-6}$-alkoxy, acyl, aryl, amino, amido, carbonamido ($CONR^6R^7$), carboxyester, sulphonamido ($SO_2NR^6R^7$) or alkylsulphonyl group; (wherein $R^6$ and $R^7$ are each independently H or optionally substituted $C_{1-6}$alkyl).

$R^3$ and $R^4$ are each independently H, hydroxy, halo, nitro, cyano, carboxy, sulpho, phosphato, optionally substituted amino (especially amino carrying one or more $C_{1-4}$-alkyl groups), optionally substituted acylamino (especially $C_{1-4}$acylamino or phenylacylamino, each of which optionally carries a sulpho or a carboxy group), optionally substituted ureido (especially ureido carrying one or two $C_{1-4}$-alkyl groups), optionally substituted $C_{1-6}$-alkyl, optionally substituted $C_{1-6}$-cycloalkyl, optionally substituted $C_{1-6}$-alkoxy, optionally substituted $C_{1-6}$-alkylthio, optionally substituted aryl, optionally substituted $C_{1-6}$-alkyl sulphonyl and optionally substituted sulphonamido (especially sulphonamido carrying one or two $C_{1-4}$-alkyl groups); and

* shows the point of attachment to the azo linkage in Formula (1).

$R^2$ is preferably an optionally substituted $C_{1-6}$-alkyl, $C_{1-6}$-alkoxy, $C_{1-6}$-acyl or amino group or a group capable of hydrogen bonding in the free acid form with the adjacent azo group such as carboxy.

As examples of the most preferred groups represented by $R^2$ there may be mentioned methyl, carboxy, $CONR^6R^7$ and H. However, most preferably $R^2$ is carboxy or $CONR^6R^7$ wherein $R^6$ and $R^7$ are each independently H or optionally substituted $C_{1-6}$alkyl.

$R^3$ and $R^4$ are most preferably each independently an optionally substituted aryl group, more preferably a phenyl or naphthyl group carrying one or more substituents selected from carboxy, sulpho, nitro, phosphato, optionally substituted $C_{1-4}$-alkyl, optionally substituted $C_{1-4}$-alkoxy, optionally substituted amino or optionally substituted $C_{1-4}$-acylamino.

As examples of groups represented by $R^3$ and $R^4$ but not limited thereto there may be mentioned 4-sulphophenyl and 2-sulphonaphthyl.

$R^5$ is most preferably a carboxy or a $C_{1-4}$alkylcarboxyester group.

Preferred optionally substituted $C_{1-6}$-alkyl groups and $C_{1-6}$-alkoxy groups present on A, B, $R^2$, $R^3$, $R^4$ and $R^5$ respectively include optionally substituted $C_{1-4}$-alkyl groups or optionally substituted $C_{1-4}$-alkoxy groups, more preferably $C_{1-4}$-alkyl groups or $C_{1-4}$-alkoxy groups which are unsubstituted or carry a halo atom or a carboxy, sulpho or phosphato group.

Preferred optionally substituted aryl groups on $R^2$, $R^3$, $R^4$ and $R^5$ are optionally substituted phenyl groups optionally substituted by nitro, carboxy, sulpho, phosphato, optionally substituted amino (especially amino carrying one or more $C_{1-4}$-alkyl groups), optionally substituted acylamino (especially $C_{1-4}$-acylamino or phenylacylamino, each of which optionally carries a sulpho or a carboxy group), optionally substituted $C_{1-6}$-alkyl, optionally substituted $C_{1-6}$-cycloalkyl, and optionally substituted $C_{1-6}$-alkoxy. In addition, the optionally substituted phenyl group preferably also carries at least one water-solubilising group selected from carboxy, sulpho and phosphato.

Preferred optionally substituted carbonamido or sulphonamido groups present on A, B, $R^2$, $R^3$, $R^4$ and $R^5$ are of the formula $CONR^6R^7$ or $SO_2NR^6R^7$ respectively wherein $R^6$ and $R^7$ are each independently H or optionally substituted $C_{1-6}$alkyl.

Preferred optionally substituted amino groups present on A, B, $R^2$, $R^3$, $R^4$ and $R^5$ respectively are optionally substituted acylamino, especially $C_{1-4}$-acylamino, more preferably optionally substituted ureido which is unsubstituted or carries a carboxy, sulpho or phosphato group.

Preferably acyl groups present on A, B, $R^2$, $R^3$, $R^4$ and $R^5$ respectively are optionally substituted $C_{1-4}$alkylacyl, optionally substituted phenylacyl, preferably acetyl or benzoyl.

Preferred substituents which may be present on the optionally substituted $C_{1-6}$-alkyl, $C_{1-6}$-alkoxy, $C_{1-6}$-alkylthio, aryl and $C_{1-6}$-alkylsulphonyl substituents on any of A, B, $R^2$, $R^3$, $R^4$, $R^5$, $R^6$ and $R^7$ are independently selected from hydroxy, halo, nitro, cyano, carboxy, sulpho, phosphato, acylamino, ureido, $C_{1-6}$-alkyl, preferably $C_{1-6}$-alkyl, more preferably methyl or ethyl, $C_{1-6}$-alkoxy, preferably $C_{1-4}$-alkoxy, more preferably methoxy or ethoxy, $C_{1-10}$-alkylthio, aryl, preferably phenyl or naphthyl, $C_{1-6}$-alkyl sulphonyl and sulphonamido.

In view of the above preferences, in a preferred embodiment:

A is phenyl carrying one or two substituents selected from carboxy, sulpho, phosphato, amino, methyl, methoxy and acetamido;

B is phenylene or naphthylene carrying one or two substituents selected from sulpho, methyl, methoxy and 2-hydroxyethoxy;
n is 0 or 1;
D is of Formula (3a), (3b) or (3c); wherein:

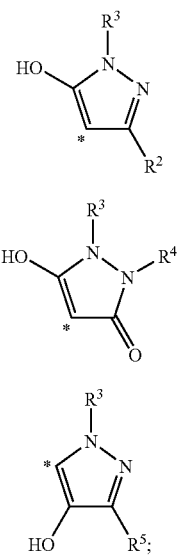

R² is H, methyl or carboxy;
R³ and R⁴ are each independently phenyl or naphthyl carrying one or two substituents selected from sulpho and carboxy; and
R⁵ is a $C_{1-4}$alkylcarboxyester.

In a further preferred embodiment:
A is phenyl carrying one or two substituents selected from carboxy, sulpho, amino, methyl, methoxy and acetamido;
B is phenylene or naphthylene carrying one or two substituents selected from sulpho, methyl, methoxy and 2-hydroxyethoxy;
n is 0 or 1; and
D is of Formula (3a), (3b) or (3c):

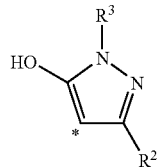

Formula (3a)

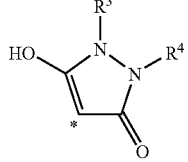

Formula (3b)

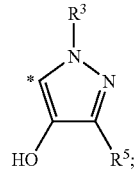

Formula (3c)

wherein:
R² and R⁵ are each independently H, carboxy, cyano or optionally substituted alkyl, alkoxy, acyl, aryl, amino, amido, carbonamido, carboxyester, sulphamoyl or alkylsulphonyl; and
R³ and R⁴ are each independently H or optionally substituted aryl or alkyl; and
* shows the point of attachment to the azo linkage in Formula (1).

In a further preferred embodiment of the present invention, there is provided a compound of Formula (2):

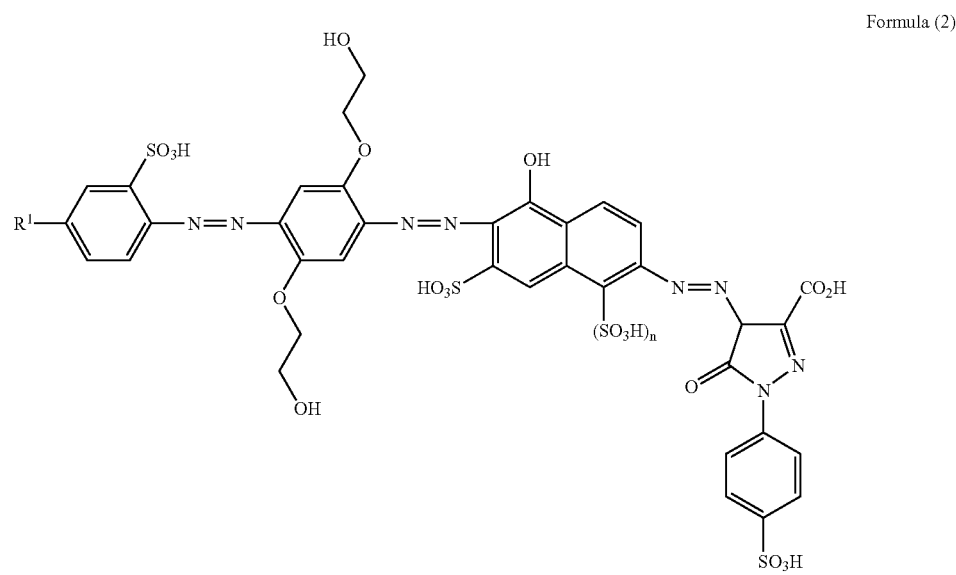

Formula (2)

wherein:

R¹ is $C_{1-4}$alkyl or $C_{1-4}$-alkoxy; and n or 0 or 1.

For compounds of Formula 2 it is preferred that R¹ is preferably methyl or methoxy.

The compounds of Formula (1) may be prepared by diazotising a compound of the Formula (4) wherein n, A and B are as hereinbefore defined to give a diazonium salt and coupling the resultant diazonium salt with a compound of Formula H-D wherein D is as hereinbefore defined:

Formula (4)

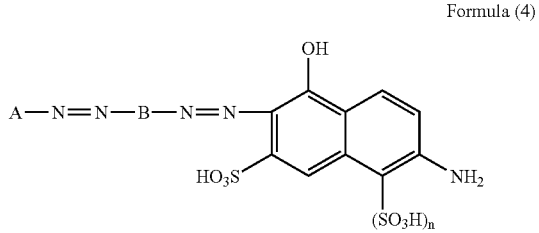

The diazotisation is preferably performed at a temperature of 0° C. to 10° C. Preferably the diazotisation is performed in water, preferably at a pH below 7. Dilute mineral acid, for example HCl or $H_2SO_4$, may be used to achieve the desired pH conditions.

The compound of Formula (4) may be prepared by diazotising a compound of Formula A-N=N-B-NH₂ to give a diazonium salt and coupling the resultant diazonium salt with 1-hydroxy-3-sulpho-6-aminonaphthylene optionally carrying a sulpho group at the 5-position, wherein A and B are as hereinbefore defined.

The compounds of Formula (2) may be prepared by diazotising a compound of the Formula (5), wherein n and R¹ are as hereinbefore defined, to give a diazonium salt and coupling the resultant diazonium salt with a compound of Formula (6):

Formula (5)

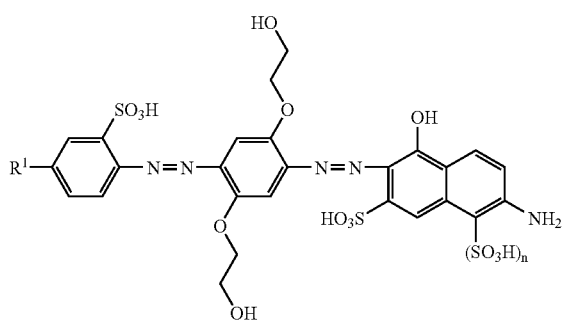

Formula (6)

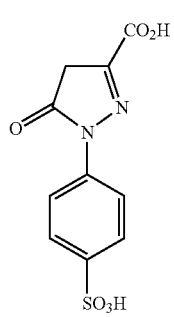

Diazotisation is again preferably performed at a temperature of 0° C. to 10° C., in water, preferably at a pH below 7 and dilute mineral acid, for example HCl or $H_2SO_4$, used to achieve the desired pH conditions.

The compound of Formula (5) may be prepared by diazotising a compound of Formula (7) to give a diazonium salt and coupling the resultant diazonium salt with 1-hydroxy-3-sulpho-7-aminonaphthylene optionally carrying a sulpho group at the 5-position, wherein R¹ is as hereinbefore defined:

Formula (7)

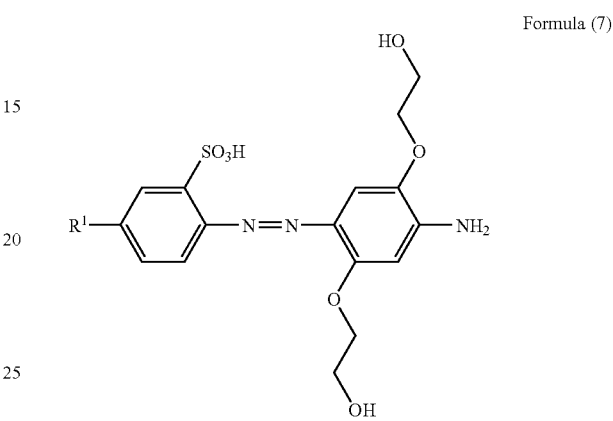

The compound of Formula (7) may be prepared by diazotising a compound of Formula (8) to give a diazonium salt and coupling the resultant diazonium salt with 2,5-bis-(2-acetoxyethoxy)aniline, followed by hydrolysis of the acetoxy groups, wherein R¹ is as hereinbefore defined:

Formula (8)

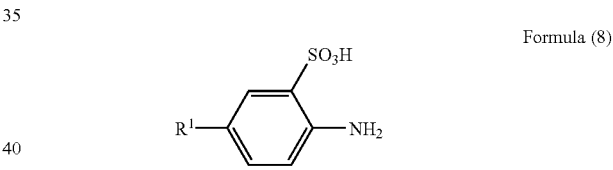

Reaction conditions for all of the above processes are those generally used in the dyestuff art, for example as described in EP 0356080.

When the compounds of the present invention are in the form of a salt the preferred salts are alkali metal salts (especially lithium, sodium and potassium salts), ammonium and substituted ammonium salts and mixtures thereof. Especially preferred salts are sodium, potassium and lithium salts, salts with ammonia and volatile amines and mixtures thereof. The lithium salts have good solubility, forming inks which are particularly storage stable with low toxicity and no tendency to block ink jet nozzles.

The compounds of the present invention may be converted into a desired salt using known techniques. For example, an alkali metal salt of a compound of the present invention may be converted into the ammonium or substituted ammonia salt by dissolving an alkali metal salt of the compound in water, acidifying with a mineral acid and adjusting the pH of the solution to pH 9 to 9.5 with ammonia or the amine and removing the alkali metal cations by dialysis or by use of an ion exchange resin.

Examples of amines which may be used to form such salts but not limited thereto include: methylamine, dimethylamine, trimethylamine, ethylamine, n-propylamine, iso-propylamine, n-butylamine, iso-butylamine, sec-butylamine, tertbutylamine, piperidine, pyridine, morpholine, allylamine, diethylamine, triethylamine, tetramethyl amine and mixtures thereof. It is not essential that the dyes of the present invention are completely in the form of the ammonium salt or substituted ammonium salt. Dyes which include both mixed alkali metal salts and either ammonium salts or substituted ammonium salts are effective, especially those in which at least 50% of the cations are ammonium or substituted ammonium ions.

Still further salts are those with the counter ions described in U.S. Pat. No. 5,830,265, claim 1, integer (b), which are included herein by reference thereto.

The compounds of the present invention may exist in tautomeric forms other than those shown in this specification. These tautomers are included within the scope of the present claims.

In a second aspect of the present invention there is provided a composition which comprises a compound of Formula (1) according to the present invention as described above and a liquid medium, wherein the liquid medium comprises water and an organic solvent.

A preferred composition according to the second aspect of the present invention comprises:
 (a) from 0.01 to 30 parts of a compound of Formula (1) or salt thereof as hereinbefore described; and
 (b) from 70 to 99.99 parts of a liquid medium;

wherein the liquid medium comprises an organic solvent and all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts. Preferably component (a) is completely dissolved in component (b). Preferably component (a) has a solubility in component (b) at 20° C. of at least 10%. This allows the preparation of liquid dye concentrates which may be used to prepare inks and reduces the chance of the dye precipitating if evaporation of the liquid medium occurs during storage.

Preferred liquid media comprise water and an organic solvent, preferably in a weight ratio of water to organic solvent of 99:1 to 1:99, more preferably 99:1 to 50:50 and especially 95:5 to 80:20.

It is preferred that the organic solvent is a water-miscible organic solvent or a mixture of such solvents. Preferred water-miscible organic solvents include: $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially ((2-methoxy-2)-ethoxy)-2-ethoxyethanol.

The compounds of the present invention may be used as the sole colorant in inks because of their attractive black shade. However, if desired, one may combine the present compounds with one or more further colorants if a slightly different shade is required for a particular end use. The further colorants are preferably dyes. When further colorants are included in the ink these are preferably selected from black, magenta, cyan and yellow colorants and combinations thereof.

Suitable further black colorants include: different colorants of the present invention, C.I. Food Black 2, C.I. Direct Black 19, C.I. Reactive Black 31, PRO-JET™ Fast Black 2, C.I. Direct Black 195; C.I. Direct Black 168; and black dyes described in patents by Lexmark (e.g. EP 0 539,178 A2, Example 1, 2, 3, 4 and 5), Orient Chemicals (e.g. EP 0 347 803 A2, pages 5-6, azo dyes 3, 4, 5, 6, 7, 8, 12, 13, 14, 15 and 16) and Seiko Epson Corporation.

Suitable further magenta colorants include: PRO-JET™ Fast Magenta 2, PRO-JET™ Magenta BTX, 3BOA, 2BTX and 1T; C.I. Acid Red 52 and 249; C.I. Reactive Red 180, 31 and 23; and C.I. Direct Red 227.

Suitable further cyan colorants include: phthalocyanine colorants, C.I. Direct Blue 199 and C.I. Acid Blue 99.

Suitable further yellow colorants include: C.I. Direct Yellow 142; C.I. Direct Yellow 132; C.I. Direct Yellow 86; C.I. Direct Yellow 85; C.I. Direct Yellow 173; and C.I. Acid Yellow 23.

The ink may also contain additional components conventionally used in ink jet printing inks, for example viscosity and surface tension modifiers, corrosion inhibitors, biocides, kogation reducing additives and surfactants which may be ionic or non-ionic.

The pH of the composition is preferably from 4 to 11, more preferably from 7 to 10.

The viscosity of the composition at 25° C. is preferably less than 50 cP, more preferably less than 20 cP and especially less than 5 cP.

When the compositions according to the second aspect of the present invention are used as ink jet printing compositions, the composition preferably has a concentration of halide ions of less than 500 parts per million, more preferably less than 100 parts per million. It is especially preferred that the composition has less than 100, more preferably less than 50 parts per million of divalent and trivalent metals, wherein parts refers to parts by weight relative to the total weight of the composition. We have found that purifying the compositions to reduce the concentration of these undesirable ions reduces nozzle blockage in ink jet printing heads, particularly in thermal ink jet printers.

A further aspect of the invention provides a process for printing an image on a substrate which comprises applying a composition according to the second aspect of the present invention to the substrate by means of an ink jet printer.

The ink jet printer preferably applies the composition to the substrate in the form of is droplets which are ejected through a small orifice onto the substrate. Preferred ink jet printers are piezoelectric ink jet printers and thermal ink jet printers. In thermal ink jet printers, programmed pulses of heat are applied to the composition in a reservoir by means of a resistor adjacent to the orifice, thereby causing the composition to be ejected in the form of small droplets directed towards the substrate during relative movement between the substrate and the orifice. In piezoelectric ink jet printers the oscillation of a small crystal causes ejection of the composition from the orifice.

The substrate is preferably paper, plastic, a textile, metal or glass, more preferably a treated substrate such as a coated paper or coated plastic, especially coated paper.

Preferred plain or treated papers are papers which may have an acid, alkaline or neutral character. Examples of commercially available plain and treated papers include: Photo Paper Pro (PR101), Photo Paper Plus (PP101), Glossy Photo Paper (GP401), Semi Gloss Paper (SG101), Matte Photo Paper (MP101), (all available from Canon); Premium Glossy Photo Paper, Premium Semi gloss Photo Paper, ColorLife™, Photo Paper, Photo Quality Glossy Paper, Double-sided Matte Paper, Matte Paper Heavyweight, Photo Quality Inkjet Paper, Bright White Inkjet Paper, Premium Plain Paper, (all available from Seiko Epson Corp); HP All-In-One Printing Paper, HP Everyday Inkjet Paper, HP Everyday Photo Paper Semi-glossy, HP Office Paper, HP Photo Paper, HP Premium High-Gloss Film, HP Premium Paper, HP Premium Photo Paper, HP Premium Plus Photo Paper, HP Printing Paper, HP Superior Inkjet Paper, (all available from Hewlett Packard Inc.); Everyday Glossy Photo Paper, Premium Glossy Photo Paper, (both available from Lexmark™ Inc.); Matte Paper, Ultima Picture Paper, Premium Picture Paper, Picture Paper, Everyday Picture Paper (available from Kodak Inc.).

A further aspect of the present invention provides a paper, an overhead projector slide or a textile material printed with a composition, a compound or by means of a process as hereinbefore defined.

A still further aspect of the present invention provides an ink jet printer cartridge, optionally refillable, comprising one or more chambers and a composition, wherein the composition is present in at least one of the chambers and the composition is as defined in accordance with the second aspect of the present invention.

The present compounds and compositions described herein provide prints of attractive, neutral black shades which are particularly well suited for the ink jet printing of text and images. The compositions have good storage stability and low tendency to block the very fine nozzles used in ink jet printers. Furthermore, the resultant images have excellent optical density, shade, light-fastness, wet-fastness, humidity fastness and resistance to fading in the presence of oxidising air pollutants.

The invention is now further illustrated by the following Examples in which all parts and percentages are by weight unless specified otherwise.

EXAMPLE 1

Preparation of:

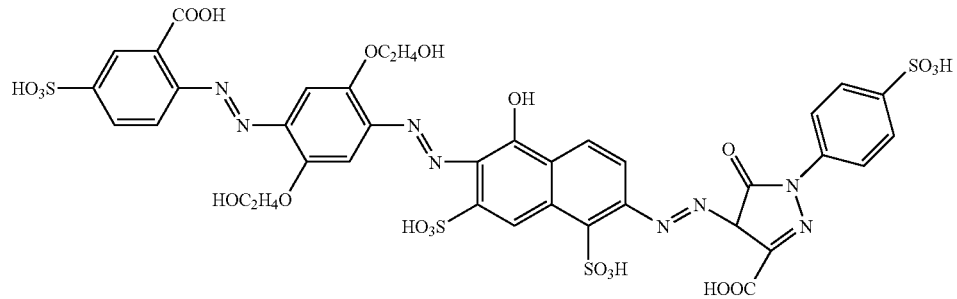

Stage A

5-Sulphoanthranilic acid (44.4 g, 32.55 g at 100%, 0.15 mole) was dissolved in water (500 ml) by adjusting the pH to pH 8-9 with lithium hydroxide solution (2M) and sodium nitrite (11.4 g, 0.17 mole) added. The solution was then added to a stirred mixture of ice and water containing concentrated hydrochloric acid (50 ml). The reaction was further stirred for 1 hour at 0-10° C. after which time excess nitrous acid was destroyed by addition of sulphamic acid.

A solution of 2,5-bis-(2-acetoxyethoxy)aniline (44.55 g, 0.16 mole) in acetone (500 ml) was added to the above prepared diazonium salt solution before stirring overnight and allowing to self warm to room temperature. The product was isolated by filtration, washed with water, slurried in acetone (1.5 liters) and again isolated by filtration before drying at 50° C. Yield =82.5 g.

Stage B

The product from Stage A (28 g, 0.06 mole) was suspended in N-methylpyrrolidone (250 ml) and sodium nitrite (7.5 g, 0.09 mole) added. After stirring for 10 minutes at room temperature a solution of concentrated hydrochloric acid (16 ml) in water (100 ml) was slowly added during which time the temperature rose to 45° C. The reaction mixture was stirred for 2 hours allowing to self-cool to room temperature and excess nitrous acid destroyed by the addition of sulphamic acid. 6-Amino-1-naphthol-3,5-disulphonic acid (20 g, 0.06 mole) was dissolved in water (200 ml) by adjusting the pH to 8-9 with lithium hydroxide solution (2M). The above prepared diazonium salt solution was then slowly added at 0-10° C. maintaining the pH at 7-8 by the addition of lithium hydroxide solution (2M) as necessary. After stirring for 1 hour lithium hydroxide (10 g) was added and the reaction mixture stirred for a further 1 hour at room temperature at which time thin layer chromatography showed the hydrolysis to be complete. The pH was adjusted to pH 7 by the addition of concentrated hydrochloric acid and lithium chloride solution (50% w/v) added. After self cooling to room temperature the product was isolated by filtration and washed with lithiurm chloride solution (50% w/v). The product was purified by dissolving in water (200 ml) and re-precipitating with acetone (2.5 liters). The acetone was removed by decantation and the residue dissolved in water to give a solution that was found, by titration with titanous chloride, to contain 0.05 mole of product. The product was used in Stage C without further purification.

Stage C—Title Dye

The product from Stage B was stirred at room temperature and sodium nitrite (3.8 g, 0.06 mole) and Calsolene™ oil (1 g) added (Calsolene™ oil is a trademark of ICI plc). The mixture was then added to a stirred mixture of ice and water containing concentrated hydrochloric acid (20 ml). Stirring was continued for 2 hours at 0-10° C. during which time the diazonium salt precipitated from solution as a suspension. A solution of 1-(4-sulphophenyl)-6-carboxypyrazol-5-one (15.5 g, 0.055 mole) was dissolved in water (200 ml) and the pH adjusted to pH 7-8 by the addition of lithium hydroxide solution (2M). The mixture was then added to the diazonium salt suspension and stirring was continued for 1 hour at 0-10° C. maintaining the pH at pH 7-8 by the addition of lithium hydroxide solution (2M) as necessary. The product was isolated by quenching/drowning out into acetone (5 liters) and subsequent filtration. The crude product was purified by dissolution in water (300 ml) and repeated quenching/drowning in acetone (2.5 liters). After filtration the product was dissolved in water and dialysed to low conductivity and finally isolated by evaporation to dryness at 70° C. Yield=46.3 g.

EXAMPLE 2

Preparation of:

Step 1: Preparation of

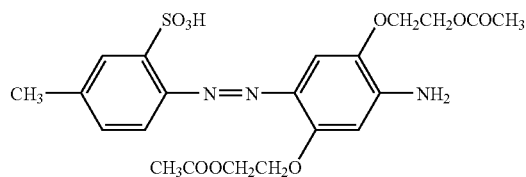

4-Aminotoluene-3-sulphonic acid (28.05 g, 0.15 mole) was dissolved in water (500 mls) and the pH adjusted to pH 7-8 by the addition of lithium hydroxide (2M). Sodium nitrite (11.4 g, 0.17 mole) was added to the solution and the mixture then added to a mixture of ice and water to which concentrated hydrochloric acid (45 ml) had been added. The reaction was further stirred for 1 hour at 0-10° C. Excess nitrous acid was then destroyed by the addition of sulphamic acid to give a diazonium salt.

2,5-Bis-(2-acetoxyethoxy)aniline (59.4 g, 0.2 mole) was dissolved in acetone (600 ml) and the solution added with stirring to the above prepared diazonium salt. The coupling mixture was then stirred overnight at room temperature. The precipitated product was isolated by filtration and washed with water (2 liters). The product was then stirred in acetone (2 liters), filtered and washed with little acetone before drying at 50° C. Yield=66.8 g.

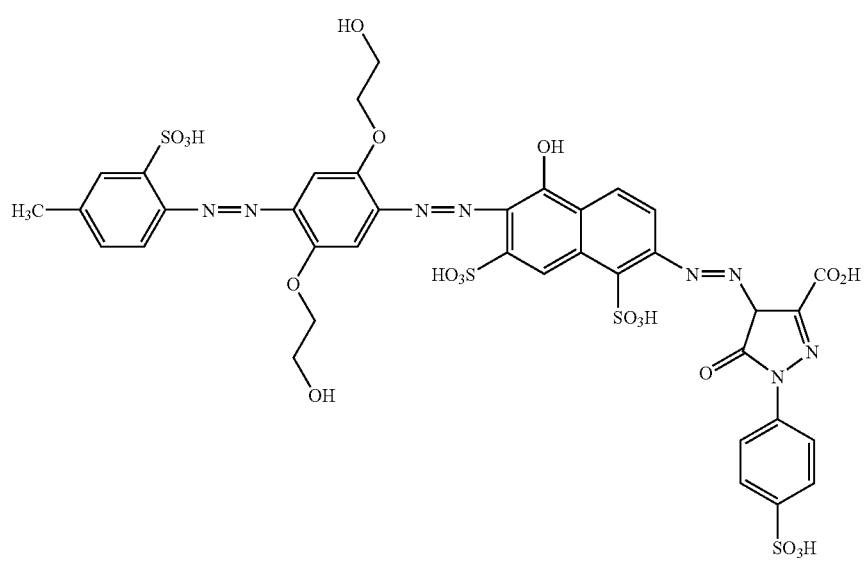

Step 2: Preparation of:

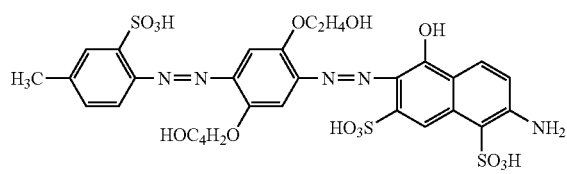

The monoazo compound prepared as described in Step 1 above (23.95 g, 0.05 mole) was suspended in N-methylpyrolidone (250 ml) and sodium nitrite (7 g, 0.1 mole) was added. After stirring for 15 mInutes at room temperature a homogeneous solution was obtained. To the stirred solution was added dilute hydrochloric acid (15 ml concentrated HCl in 100 ml with water) over 5 minutess (exothermic) and stirring was continued for 2 hours allowing to self cool to room temperature. Excess nitrous acid was removed by the addition of sulphamic acid.

6-amino-1-naphthol-3-sulphonic acid (18 g, 0.056 mole) was dissolved in water (200 ml) and the pH adjusted to pH 10 by the addition of lithium hydroxide (2M). The solution was stirred and cooled to 0-10° C. and the diazonium salt solution was slowly added, maintaining the pH between pH 10-10.5 by the addition of lithium hydroxide (2M) as necessary. The mixture was further stirred for 1 hour at 0-10° C. before allowing to warm to room temperature. Lithium hydroxide (10 g) was added and stirring was continued at room temperature until thin layer chromotography showed hydrolysis was complete. The pH of the reaction mixture was then adjusted to pH 7 by the addition of concentrated hydrochloric acid. Lithium chloride solution (30% w/v) was then slowly added (exothermic). The product was isolated by filtration at 70° C. and air-dried. The crude product was dissolved in water (1 liter) at 40° C. and re-precipitated by the addition of lithium chloride solution (20% w/v) during which time the temperature rose to 70° C. The product was then isolated by filtration of the hot suspension and washed with lithium chloride solution (25% w/v, 1 liter). The resulting product was dissolved in water (340 mls) to give a solution that was found, by titration with titanous chloride, to contain 0.043 mole of product. This solution of the product was used in Step 3 without further purification.

Step 3: Preparation of Title Compound:

The product of step 2 above (340 mls, 31.57 g at 100%) was stirred at room temperature and sodium nitrite (3.3 g, 0.048 mole) added followed by Calsolene™ oil (1 g, Calsolene™ oil is a trademark of ICI pic). The resulting mixture was then added to a mixture of ice and water containing concentrated hydrochloric acid (17 ml). Stirring was continued for 2 hours at 0-10° C. during which time the diazonium salt precipitated from solution forming a suspension. The excess nitrous acid was destroyed by the addition of sulphamic acid. 1-(4-sulphophenyl)-3-carboxypyrazol-5-one (14 g, 0.049 mole) was dissolved in water (200 ml) and the pH adjusted to pH 7-8 by the addition of lithium hydroxide solution (2M). This solution was then added to the diazonium salt suspension and the pH of the reaction mixture adjusted to pH 7 by the addition of lithium hydroxide solution (2M) and stirring continued for 1 hour at 0-10° C., during which time the pH was maintained at pH 7-8 by the addition of lithium hydroxide solution (2M) as necessary. The product was isolated by quenching/drowning out into acetone (4 liters) followed by subsequent filtration and washing with acetone. The product was dissolved in water (500 mls) and dialysed to low conductivity and finally isolated by evaporation to dryness at 70° C. Yield=39.5 g.

EXAMPLE 3

Preparation of:

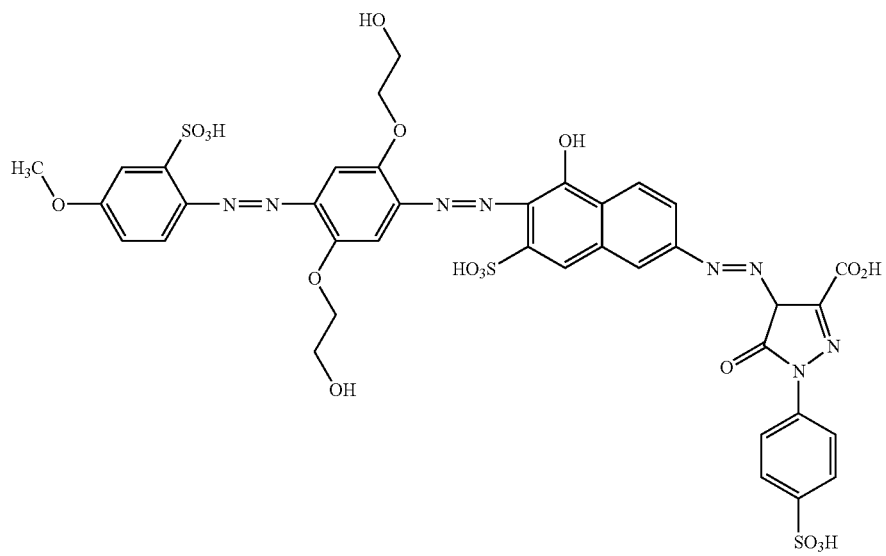

The method of Example 2 was repeated except that in Step 1, 2-amino-5-methoxybenzenesulphonic acid (30.45 g) was used in place of 4-amino-3-toluenesulphonic acid, and in Step 2, 6-amino-1-naphthol-3-sulphonic acid (14.84 g) was used in place of 6-amino-1-naphthol-3,5-disulphonic acid.

EXAMPLE 4

Preparation of:

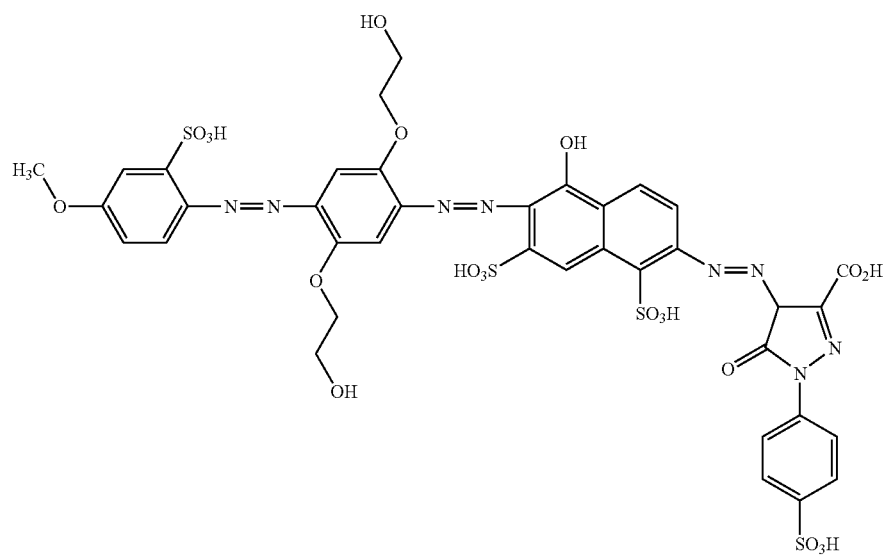

The method of Example 2 was repeated except that in Step 1, 2-amino-5-methoxybenzenesulphonic acid (30.45 g) was used in place of 4-amino3-toluenesulphonic acid.

EXAMPLES 5-48

The method of Example 1 was repeated except that in Stage A the 5-sulphoanthranilic acid was replaced with an amine of a formula corresponding to the structure in column A of Table 1; where indicated by n=0 in column 3 of Table 1, the 6-amino-1-naphthol-3,5-disulphonic acid from Example 1 was replaced with 6-amino-1-naphthol-3-sulphonic acid; and in Stage C of Example 1, the 1-(4-sulphophenyl)-3-carboxy-pyrazol-5-one was replaced by a pyrazolone of formula D as indicated in column 4 of Table 1. For Examples 12 and 45 the product from Stage C of Example 1 was dissolved at pH 13 in lithium hydroxide solution and heated at 70° C. for 6 hours to remove the acetyl group from the amine component shown in column A of Table 1 before isolation and dialysis. The final dye structure of the resultant compounds are also shown in Table 1.

EXAMPLES 49-62

The method for Example 1 was repeated except that in Stage A the 5-sulphoanthranilic acid was replaced with an amine of a formula corresponding to the structure in column A of Table 2 and the 2,5-bis-(2-acetoxyethoxy)aniline was replaced with an amine of a formula corresponding to the structure in column B of Table 2; where indicated by n=0 in column 4 of Table 2, the 6-amino-1-naphthol-3,5-disulphonic acid was replaced with 6-amino-1-naphthol-3-sulphonic acid, and in Stage C, the 1-(4-sulphophenyl)-3-carboxypyrazol-5-one was replaced by a pyrazolone of formula D as is indicated in Table 2.

EXAMPLE 61

The product from Stage C was dissolved at pH 13 in lithium hydroxide and heated at 70° C. for 6 hours to remove the acetyl group from the amine component shown in column A of Table 2 before isolation and dialysis. The structures of the compounds are all shown in column 6 of Table 2.

TABLE 1

| Example | A | n | D | Final dye structure | $\lambda_{max}/\epsilon$ | Mass Spectrum Analysis |
|---------|---|---|---|---------------------|--------------------------|------------------------|
| 1 | 2-amino-5-sulfobenzoic acid (COOH, NH₂, SO₃H substituted benzene) | 1 | 1-(4-sulfophenyl)-3-carboxy-5-pyrazolone | (trisazo dye structure with naphthol core bearing OH, SO₃H, and two OC₂H₄OH groups, coupled to pyrazolone and sulfobenzoic acid) | 580 nm 64,333 | |
| 2 | 2-amino-5-methylbenzenesulfonic acid (SO₃H, NH₂, CH₃ substituted benzene) | 1 | 1-(4-sulfophenyl)-3-carboxy-5-pyrazolone | (trisazo dye structure with naphthol core bearing OH, SO₃H, and two OC₂H₄OH groups, coupled to pyrazolone and methyl-sulfobenzene) | 590 nm 53,525 | |

TABLE 1-continued

| Example | A | n | D | Final dye structure | $\lambda_{max}/\epsilon$ | Mass Spectrum Analysis |
|---|---|---|---|---|---|---|
| 3 | 2-amino-5-methoxybenzenesulfonic acid | 0 | 1-(4-sulfophenyl)-5-oxo-3-carboxy-pyrazoline | (structure) | 594 nm 54,200 | m/z 971 (M − H)⁻ m/z 485 (M − 2H)²⁻ m/z 323 (M − 3H)³⁻ m/z 242 (M − 4H)⁴⁻ |
| 4 | 2-amino-5-methoxybenzenesulfonic acid | 1 | 1-(4-sulfophenyl)-5-oxo-3-carboxy-pyrazoline | (structure) | 588 nm 66,100 | m/z 525 (M − 2H)²⁻ m/z 350 (M − 3H)³⁻ m/z 262 (M − 4H)⁴⁻ m/z 536 (M − 2H + Na)²⁻ |

TABLE 1-continued

| Example | A | n | D | Final dye structure | λ_max/ε | Mass Spectrum Analysis |
|---|---|---|---|---|---|---|
| 5 | 4-acetamido-2-carboxyaniline (structure with COOH, NH2, NHC(O)CH3) | 1 | pyrazolone-carboxylic acid with 4-sulfophenyl (structure) | [complex bis-azo dye structure] | 583 nm 65,187 | |
| 6 | 2,5-diamino-1,4-benzenedisulfonic acid (structure with NH2, SO3H groups) | 0 | pyrazolone-carboxylic acid with 4-sulfophenyl (structure) | [complex bis-azo dye structure] | 604 nm 70,200 | |

TABLE 1-continued

| Example | A | n | D | Final dye structure | $\lambda_{max}$/ε | Mass Spectrum Analysis |
|---|---|---|---|---|---|---|
| 7 | 2,4-dimethyl-5-sulfo aniline | 0 | pyrazolone-carboxylic acid-sulfophenyl | (structure) | 586 nm 52,800 | |
| 8 | 2,4-dimethyl-5-sulfo aniline | 1 | pyrazolone-carboxylic acid-sulfophenyl | (structure) | 581 nm 63,300 | m/z 955 (M − H)⁻ m/z 477 (M − 2H)²⁻ m/z 318 (M − 3H)³⁻ m/z 238 (M − 4H)⁴⁻ |

TABLE 1-continued

| Example | A | n | D | Final dye structure | $\lambda_{max}$/ε Mass Spectrum Analysis |
|---|---|---|---|---|---|
| 9 | 2-amino-5-methylbenzenesulfonic acid | 0 | 1-(4-sulfophenyl)-5-oxo-3-carboxy-pyrazole | (structure) | 590 nm 53,525 |
| 10 | 2-amino-5-sulfobenzoic acid | 0 | 1-(4-sulfophenyl)-5-oxo-3-carboxy-pyrazole | (structure) | 587 nm 66,463 |

TABLE 1-continued

| Example | A | n | D | Final dye structure | $\lambda_{max}/\epsilon$ | Mass Spectrum Analysis |
|---|---|---|---|---|---|---|
| 11 | (structure) | 1 | (structure) | (structure) | 588 nm 68,927 | |
| 12 | (structure) | 0 | (structure) | (structure) | 605 nm 57,932 | |

TABLE 1-continued

| Example | A | n | D | Final dye structure | $\lambda_{max}$/ε | Mass Spectrum Analysis |
|---|---|---|---|---|---|---|
| 13 | 4-amino-3-sulfo acetanilide | 0 | 5-oxo-1-(4-sulfophenyl)-3-carboxy-pyrazole | (structure) | 584 nm 62,932 | |
| 14 | 4-amino-3-sulfo acetanilide | 1 | 5-oxo-1-(4-sulfophenyl)-3-methyl-pyrazole | (structure) | 568 nm 68,638 | |

TABLE 1-continued

| Example | A | n | D | Final dye structure | $\lambda_{max}/\epsilon$ Mass Spectrum Analysis |
|---|---|---|---|---|---|
| 15 | 2-amino-5-methylbenzenesulfonic acid (SO₃H, NH₂, CH₃ substituents) | 0 | 3-methyl-1-(4-sulfophenyl)-5-pyrazolone | (bis-azo dye structure with pyrazolone, naphthalene, and methylphenyl sulfonic acid groups) | 573 nm 46,191 m/z (M − 2H)²⁻ 462 m/z (M − 3H)³⁻ 308 |
| 16 | 2-amino-5-methoxybenzenesulfonic acid (SO₃H, NH₂, OCH₃ substituents) | 0 | 3-methyl-1-(4-sulfophenyl)-5-pyrazolone | (bis-azo dye structure with pyrazolone, naphthalene, and methoxyphenyl sulfonic acid groups) | 576 nm 55,667 |

TABLE 1-continued

| Example | A | n | D | Final dye structure | Mass Spectrum Analysis $\lambda_{max}/\epsilon$ |
|---|---|---|---|---|---|
| 17 | (structure with H3C-O, NH2, CH3, HO-S(=O)2) | 0 | (pyrazolone with COOH, N=N, phenyl-SO3H) | (final azo dye structure) | 597 nm 56,179 |
| 18 | (structure with H3C-O, NH2, CH3, HO-S(=O)2) | 0 | (pyrazolone with CH3, N=N, phenyl-SO3H) | (final azo dye structure) | 593 nm 50,069 |

TABLE 1-continued

| Example | A | n | D | Final dye structure | $\lambda_{max}$/ε | Mass Spectrum Analysis |
|---|---|---|---|---|---|---|
| 19 | (3-methoxy-4-amino benzenesulfonic acid derivative) | 0 | (1-(4-sulfophenyl)-3-carboxy-5-pyrazolone) | (final dye structure) | 590 nm 58,729 | |
| 20 | (3-methoxy-4-amino benzenesulfonic acid derivative) | 0 | (1-(4-sulfophenyl)-3-methyl-5-pyrazolone) | (final dye structure) | 579 nm 51,271 | |

TABLE 1-continued

| Example | A | n | D | Final dye structure | Mass Spectrum Analysis $\lambda_{max}/\epsilon$ |
|---|---|---|---|---|---|
| 21 | (structure shown) | 0 | (structure shown) | (structure shown) | 602 nm 54,809 |
| 22 | (structure shown) | 0 | (structure shown) | (structure shown) | 601 nm 50,126 |

TABLE 1-continued

| Example | A | n | D | Final dye structure | $\lambda_{max}$/ε Mass Spectrum Analysis |
|---|---|---|---|---|---|
| 23 | (structure: 4-amino-2,5-dimethylbenzenesulfonic acid) | 0 | (structure: 1-(4-sulfophenyl)-5-oxo-3-carboxy-pyrazoline) | (final trisazo dye structure) | 582 nm 55,325 |
| 24 | (structure: 4-amino-2,5-dimethylbenzenesulfonic acid) | 0 | (structure: 1-(4-sulfophenyl)-3-methyl-5-oxo-pyrazoline) | (final trisazo dye structure) | 579 nm 47,095 |

TABLE 1-continued

| Example | A | n | D | Final dye structure | $\lambda_{max}/\epsilon$ | Mass Spectrum Analysis |
|---|---|---|---|---|---|---|
| 26 | (2-amino-5-butylbenzenesulfonic acid structure) | 0 | (1-(4-sulfophenyl)-5-oxo-3-carboxy-pyrazoline structure) | (final dye structure) | 583 nm 55,580 | |
| 26 | (2-amino-5-butylbenzenesulfonic acid structure) | 0 | (1-(4-sulfophenyl)-3-methyl-5-oxo-pyrazoline structure) | (final dye structure) | 572 nm 53,602 | |

TABLE 1-continued

| Example | A | n | D | Final dye structure | Mass Spectrum Analysis $\lambda_{max}/\epsilon$ |
|---|---|---|---|---|---|
| 27 | (structure) | 1 | (structure) | (structure) | 588 nm 63,934 |
| 28 | (structure) | 1 | (structure) | (structure) | 584 nm 62,570 |

TABLE 1-continued

| Example | A | n | D | Final dye structure | $\lambda_{max}/\epsilon$ | Mass Spectrum Analysis |
|---------|---|---|---|---------------------|--------------------------|-------------------------|
| 29 | (structure) | 1 | (structure) | (structure) | 581 nm 60,992 | |
| 30 | (structure) | 1 | (structure) | (structure) | 584 nm 62,570 | |

TABLE 1-continued

| Example | A | n | D | Final dye structure | $\lambda_{max}/\epsilon$ | Mass Spectrum Analysis |
|---|---|---|---|---|---|---|
| 31 | (2-amino-5-methoxybenzenesulfonic acid structure) | 0 | (pyrazolone-sulfophenyl structure) | (final dye structure) | 590 nm 54,908 | |
| 32 | (4-amino-2-methoxy-5-methylbenzenesulfonic acid structure) | 1 | (pyrazolone-sulfophenyl structure) | (final dye structure) | 580 nm 63,132 | |

TABLE 1-continued

| Example | A | n | D | Final dye structure | $\lambda_{max}/\epsilon$ | Mass Spectrum Analysis |
|---|---|---|---|---|---|---|
| 33 | (structure) | 1 | (structure) | (structure) | 586 nm 72,760 | |
| 34 | (structure) | 1 | (structure) | (structure) | 586 nm 57,719 | $(M-2H)^{2-}$ 521 m/z $(M-3H)^{3-}$ 347 |

TABLE 1-continued

| Example | A | n | D | Final dye structure | $\lambda_{max}$ nm / $\epsilon$ | Mass Spectrum Analysis |
|---|---|---|---|---|---|---|
| 35 | [2-amino-5-sulfobenzoic acid structure] | 1 | [pyrazolone with 4-carboxyphenyl and carboxymethyl structure] | [final dye structure] | 581 nm 63,864 | m/z (M − 2H)²⁻ 499 m/z (M − 3H)³⁻ 347 |
| 36 | [2-amino-4-methoxy-benzenesulfonic acid structure] | 1 | [pyrazolone with 4-carboxyphenyl and carboxymethyl structure] | [final dye structure] | 583 nm 48,299 | m/z (M − 3H)³⁻ 343 |

TABLE 1-continued
| Example | A | n | D | Final dye structure | $\lambda_{max}/\epsilon$ Mass Spectrum Analysis |
|---|---|---|---|---|---|
| 37 | 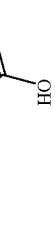 | 1 | 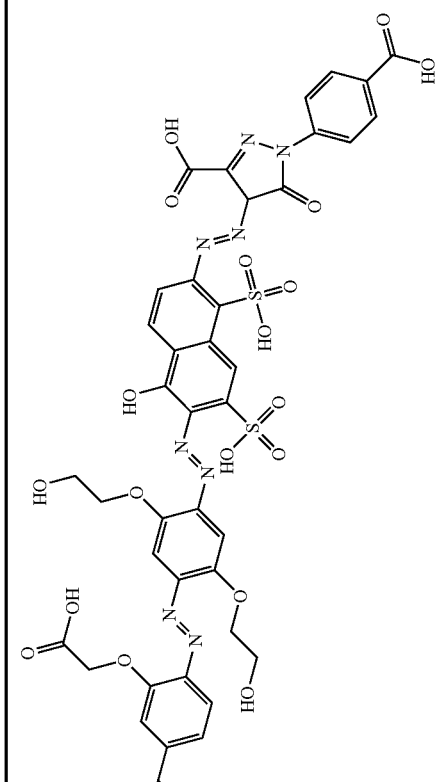 | 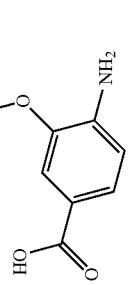 | 592 nm 70,812 |
| 38 | 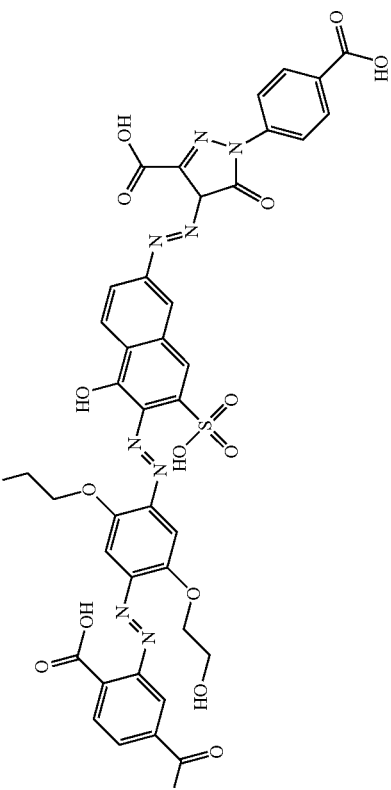 | 0 | 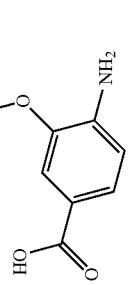 | 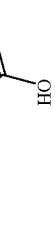 | 581 nm 65,215 |

TABLE 1-continued

| Example | A | n | D | Final dye structure | $\lambda_{max}/\epsilon$ | Mass Spectrum Analysis |
|---|---|---|---|---|---|---|
| 39 | | 0 | | | 579 nm 65,233 | |
| 40 | | 0 | | | 599 nm 71,080 | |

TABLE 1-continued

| Example | A | n | D | Final dye structure | $\lambda_{max}/\epsilon$ Mass Spectrum Analysis |
|---|---|---|---|---|---|
| 41 | (2-amino-5-sulfo-indane structure) | 1 | (1-(4-sulfophenyl)-3-carboxy-5-pyrazolone structure) | (final dye structure) | 584 nm 65,530 |
| 42 | (2-aminobenzenesulfonic acid structure) | 1 | (1-(4-sulfophenyl)-3-carboxy-5-pyrazolone structure) | (final dye structure) | 579 nm 66,570 |

TABLE 1-continued

| Example | A | n | D | Final dye structure | Mass Spectrum Analysis $\lambda_{max}/\epsilon$ |
|---------|---|---|---|---------------------|------------------------------------------------|
| 43 | 2-aminobenzoic acid | 1 | carboxy-pyrazolone-sulfophenyl | (structure shown) | 579 nm 64,714 |
| 44 | 2-amino-5-nitrobenzoic acid | 1 | carboxy-pyrazolone-sulfophenyl | (structure shown) | 589 nm 59,671 |

TABLE 1-continued
| Example | A | n | D | Final dye structure | $\lambda_{max}/\epsilon$ Mass Spectrum Analysis |
|---|---|---|---|---|---|
| 45 | 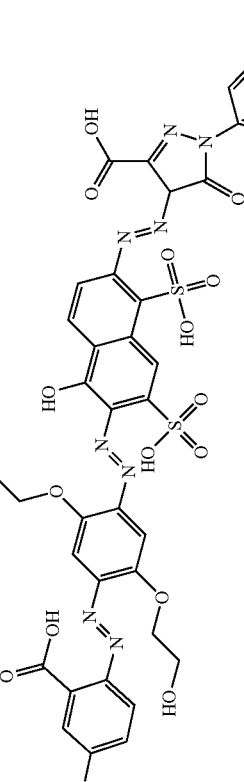 | 1 | 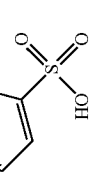 | 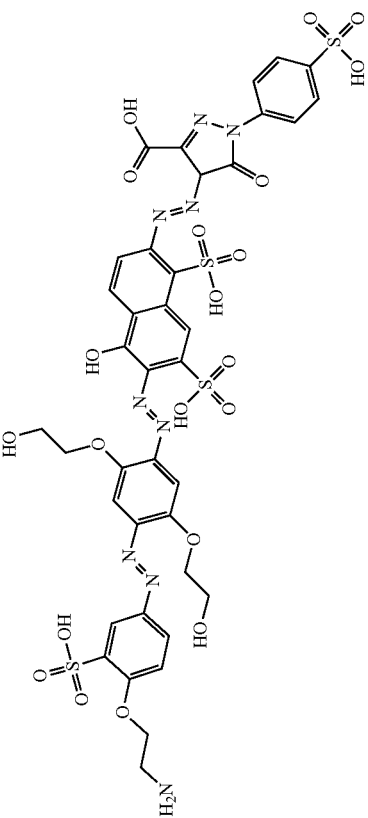 | 599 nm 65,849 |
| 46 | 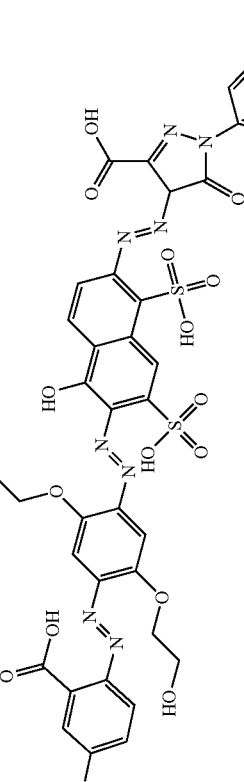 | 1 | 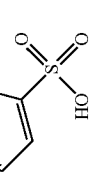 | 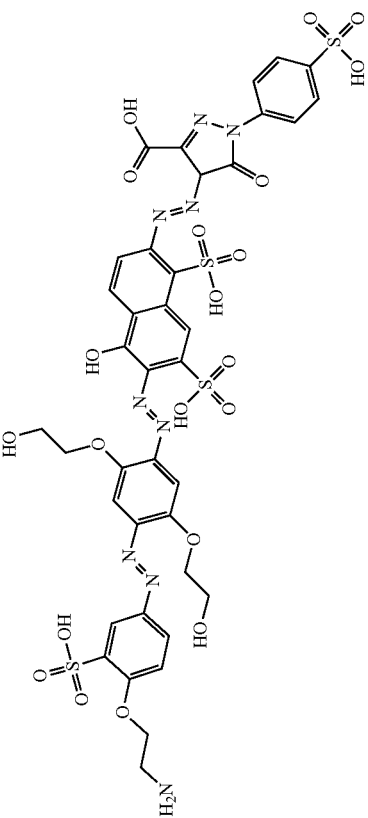 | 568 nm 64,575 |

TABLE 1-continued

| Example | A | n | D | Final dye structure | λ_max/ε Mass Spectrum Analysis |
|---|---|---|---|---|---|
| 47 | (2-amino-5-nitrobenzenesulfonic acid) | 1 | (1-(4-sulfophenyl)-3-carboxy-5-pyrazolone) | (dye structure) | 591 nm 71,214 |
| 48 | (2-amino-5-methoxybenzoic acid) | 1 | (1-(4-sulfophenyl)-3-carboxy-5-pyrazolone) | (dye structure) | 587 nm 63,510 |

TABLE 2

| Example | A | B | n | D | Final dye structure | $\lambda_{max}$/ε | Mass Spectrum Analysis |
|---|---|---|---|---|---|---|---|
| 49 | | | 0 | | | 577 nm 72,251 | |
| 50 | | | 1 | | | 572 nm 72,224 | |
| 51 | | | 0 | | | 590 nm 69,973 | |

TABLE 2-continued

| Example | A | B | n | D | Final dye structure | $\lambda_{max}$/ε | Mass Spectrum Analysis |
|---|---|---|---|---|---|---|---|
| 52 | (structure) | (structure) | 0 | (structure) | (structure) | 569 nm 72,207 | |
| 53 | (structure) | (structure) | 0 | (structure) | (structure) | 583 nm 71,163 | |
| 54 | (structure) | (structure) | 0 | (structure) | (structure) | 585 nm 54,476 | 895 m/z (M−H)⁻; 447 m/z (M−2H)²⁻; 223 (M−4H)⁴⁻ |

TABLE 2-continued

| Example | A | B | n | D | Final dye structure | $\lambda_{max}/\epsilon$ | Mass Spectrum Analysis |
|---|---|---|---|---|---|---|---|
| 55 | (structure) | (structure) | 1 | (structure) | (structure) | 568 nm 71,856 | |
| 56 | (structure) | (structure) | 0 | (structure) | (structure) | 581 nm 70,090 | |
| 57 | (structure) | (structure) | 0 | (structure) | (structure) | 590 nm 57,488 | m/z 911 (M − H)⁻ m/z 455 (M − 2H)²⁻ 227 (M − 4H)⁴⁻ |

TABLE 2-continued

| Example | A | B | n | D | Final dye structure | $\lambda_{max}$ nm / $\epsilon$ Mass Spectrum Analysis |
|---|---|---|---|---|---|---|
| 58 | | | 0 | | | 578 nm 73,349 |
| 59 | | | 0 | | | 596 nm 56,926 |
| 60 | | | 1 | | | 600 nm 65,514 |

TABLE 2-continued

| Example | A | B | n | D | Final dye structure | Mass Spectrum Analysis $\lambda_{max}$ nm / $\epsilon$ |
|---|---|---|---|---|---|---|
| 61 | (structure) | (structure) | 1 | (structure) | (structure) | 579 nm 68,429 |
| 62 | (structure) | (structure) | 1 | (structure) | (structure) | 587 nm 68,318 |

EXAMPLE 63

Inks

Inks may be prepared containing the dyes from Example 1 to Example 62 according to the following formulation:

| | |
|---|---|
| 2-Pyrrolidone | 5 parts |
| Thiodiglycol | 5 parts |
| Surfynol™ 465 | 1 part |
| Dye | 3 parts |
| Water | amount required to make up to 100 parts |

Surfynol™ 465 is a surfactant available from Air Products and Chemicals Inc., USA. Further inks may be prepared according to Tables 3 to 8 wherein the dye described in the first column is the dye made in the above example of the same number. Numbers quoted in the second column onwards refer to the number of parts of the relevant ingredient and all parts are by weight. The inks may be applied to paper by thermal or piezo ink jet printing.

| | |
|---|---|
| PG = | propylene glycol |
| DEG = | diethylene glycol |
| NMP = | N-methyl pyrollidone |
| DMK = | dimethylketone |
| IPA = | isopropanol |
| MEOH = | methanol |
| 2P = | 2-pyrollidone |
| MIBK = | methylisobutyl ketone |
| P12 = | propane-1,2-diol |
| BDL = | butane-2,3-diol |
| CET = | cetyl ammonium bromide |
| PHO = | $Na_2HPO_4$ and |
| TBT = | tertiary butanol |
| TDG = | thiodiglycol |

TABLE 3

| Dye | Compound Content | Water | PG | DEG | NMP | DMK | NaOH | Na Stearate | IPA | MEOH | 2P | MIBK |
|---|---|---|---|---|---|---|---|---|---|---|---|---|
| 2 | 2.0 | 80 | 5 | | 6 | 4 | | | | | 5 | |
| 3 | 3.0 | 90 | | 5 | 5 | | 0.2 | | | | | |
| 4 | 10.0 | 85 | 3 | | 3 | 3 | | | | 5 | 1 | |
| 1 | 2.1 | 91 | | 8 | | | | | | | | 1 |
| 3 | 3.1 | 86 | 5 | | | | | 0.2 | 4 | | | 5 |
| 4 | 1.1 | 81 | | | 9 | | 0.5 | 0.5 | | | 9 | |
| 2 | 2.5 | 60 | 4 | 15 | 3 | 3 | | | 6 | 10 | 5 | 4 |
| 1 | 5 | 65 | | 20 | | | | | 10 | | | |
| 4 | 2.4 | 75 | 5 | 4 | | 5 | | | | 6 | | 5 |
| 2 | 4.1 | 80 | 3 | 5 | 2 | 10 | | 0.3 | | | | |
| 3 | 3.2 | 65 | | 5 | 4 | 6 | | | 5 | 4 | 6 | 5 |
| 4 | 5.1 | 96 | | | | | | | | 4 | | |
| 2 | 10.8 | 90 | 5 | | | | | | 5 | | | |
| 3 | 10.0 | 80 | 2 | 6 | 2 | 5 | | | 1 | | 4 | |
| 1 | 1.8 | 80 | | 5 | | | | | | | 15 | |
| 2 | 2.6 | 84 | | | 11 | | | | | | 5 | |
| 3 | 3.3 | 80 | 2 | | | 10 | | | | 2 | | 6 |
| 4 | 12.0 | 90 | | | | 7 | 0.3 | | 3 | | | |
| 1 | 5.4 | 69 | 2 | 20 | 2 | 1 | | | | | 3 | 3 |
| 3 | 6.0 | 91 | | | 4 | | | | | | 5 | |

TABLE 4

| Dye | Dye Content | Water | PG | DEG | NMP | CET | TBT | TDG | BDL | PHO | 2P | PI2 |
|---|---|---|---|---|---|---|---|---|---|---|---|---|
| 2 | 3.0 | 80 | 15 | | | 0.2 | | | | | 5 | |
| 3 | 9.0 | 90 | | 5 | | | | | | 1.2 | | 5 |
| 4 | 1.5 | 85 | 5 | 5 | | 0.15 | 5.0 | 0.2 | | | | |
| 1 | 2.5 | 90 | | | 6 | 4 | | | | 0.12 | | |
| 3 | 3.1 | 82 | 4 | 8 | | 0.3 | | | | | | 6 |
| 4 | 0.9 | 85 | | | 10 | | | | 5 | 0.2 | | |
| 2 | 8.0 | 90 | | 5 | 5 | | | 0.3 | | | | |
| 1 | 4.0 | 70 | | | 10 | 4 | | | 1 | | 4 | 11 |
| 4 | 2.2 | 75 | 4 | 10 | 3 | | | | 2 | | 6 | |
| 2 | 10.0 | 91 | | | 6 | | | | | | 3 | |
| 3 | 9.0 | 76 | | 9 | 7 | | 3.0 | | | 0.95 | 5 | |
| 1 | 5.0 | 78 | 5 | 11 | | | | | | | 6 | |
| 2 | 5.4 | 86 | | | 7 | | | | | | 7 | |
| 3 | 2.1 | 70 | 5 | 5 | 5 | 0.1 | 0.2 | 0.1 | 5 | 0.1 | 5 | |
| 4 | 2.0 | 90 | | | 10 | | | | | | | |
| 1 | 2 | 88 | | | | | | 10 | | | | |
| 3 | 5 | 78 | | | | 5 | | 12 | | | 5 | |
| 4 | 8 | 70 | 2 | | 8 | | | 15 | | | 5 | |
| 2 | 10 | 80 | | | | | | 8 | | | 12 | |
| 3 | 10 | 80 | | | 10 | | | | | | | |

TABLE 5

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 6 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |
| 5 | 3.1 | 86 | 5 | | | | | 0.2 | 4 | | | 5 |
| 2 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | | 20 | | | | | 10 | | | |
| 15 | 2.4 | 75 | 5 | 4 | | 5 | | | | 6 | | 5 |
| 34 | 4.1 | 80 | 3 | 5 | 2 | 10 | | 0.3 | | | | |
| 1 | 3.2 | 65 | | 5 | 4 | 6 | | | 5 | 4 | 6 | 5 |
| 6 | 5.1 | 96 | | | | | | | | 4 | | |
| 3 | 10.8 | 90 | 5 | | | | | | 5 | | | |
| 4 | 10.0 | 80 | 2 | 6 | 2 | 5 | | | 1 | | 4 | |
| 5 | 1.8 | 80 | | 5 | | | | | | | 15 | |
| 2 | 2.6 | 84 | | | 11 | | | | | | 5 | |
| 7 | 3.3 | 80 | 2 | | | 10 | | | | 2 | | 6 |
| 8 | 12.0 | 90 | | | | 7 | 0.3 | | 3 | | | |
| 9 | 5.4 | 69 | 2 | 20 | 2 | 1 | | | | | 3 | 3 |
| 10 | 6.0 | 91 | | | 4 | | | | | | 5 | |

TABLE 6

| Dye | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 | | | 0.2 | | | | | 5 | |
| 6 | 9.0 | 90 | | 5 | | | | | | 1.2 | | 5 |
| 3 | 1.5 | 85 | 5 | 5 | | 0.15 | 5.0 | 0.2 | | | | |
| 4 | 2.5 | 90 | | 6 | 4 | | | | | 0.12 | | |
| 5 | 3.1 | 82 | 4 | 8 | | 0.3 | | | | | | 6 |
| 2 | 0.9 | 85 | | | 10 | | | | 5 | 0.2 | | |
| 7 | 8.0 | 90 | | 5 | 5 | | | 0.3 | | | | |
| 8 | 4.0 | 70 | | 10 | 4 | | | | 1 | | 4 | 11 |
| 13 | 2.2 | 75 | 4 | 10 | 3 | | | | 2 | | 6 | |
| 25 | 10.0 | 91 | | | 6 | | | | | | 3 | |
| 1 | 9.0 | 76 | | 9 | 7 | | 3.0 | | | 0.95 | 5 | |
| 6 | 5.0 | 78 | 5 | 11 | | | | | | | 6 | |
| 3 | 5.4 | 86 | | | 7 | | | | | | 7 | |
| 4 | 2.1 | 70 | 5 | 5 | 5 | 0.1 | 0.2 | 0.1 | 5 | 0.1 | 5 | |
| 5 | 2.0 | 90 | | 10 | | | | | | | | |
| 2 | 2 | 88 | | | | | | 10 | | | | |
| 7 | 5 | 78 | | | 5 | | | 12 | | | 5 | |
| 8 | 8 | 70 | 2 | | 8 | | | 15 | | | 5 | |
| 42 | 10 | 80 | | | | | | 8 | | | 12 | |
| 56 | 10 | 80 | | | 10 | | | | | | | |

TABLE 7

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 10 | 2.0 | 80 | 5 | | 6 | 4 | | | | | 5 | |
| 12 | 3.0 | 90 | | 5 | 5 | | 0.2 | | | | | |
| 13 | 10.0 | 85 | 3 | | 3 | 3 | | | | 5 | 1 | |
| 19 | 2.1 | 91 | | 8 | | | | | | | | 1 |
| 20 | 3.1 | 86 | 5 | | | | | 0.2 | 4 | | | 5 |
| 21 | 1.1 | 81 | | | 9 | | 0.5 | 0.5 | | | 9 | |
| 30 | 2.5 | 60 | 4 | 15 | 3 | 3 | | | 6 | 10 | 5 | 4 |
| 47 | 5 | 65 | | 20 | | | | | 10 | | | |
| 48 | 2.4 | 75 | 5 | 4 | | 5 | | | | 6 | | 5 |
| 50 | 4.1 | 80 | 3 | 5 | 2 | 10 | | 0.3 | | | | |
| 51 | 3.2 | 65 | | 5 | 4 | 6 | | | 5 | 4 | 6 | 5 |
| 53 | 5.1 | 96 | | | | | | | | 4 | | |
| 62 | 10.8 | 90 | 5 | | | | | | 5 | | | |
| 1 | 10.0 | 80 | 2 | 6 | 2 | 5 | | | 1 | | 4 | |
| 11 | 1.8 | 80 | | 5 | | | | | | | 15 | |
| 14 | 2.6 | 84 | | | 11 | | | | | | 5 | |
| 15 | 3.3 | 80 | 2 | | | 10 | | | | 2 | | 6 |

TABLE 7-continued

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 60 | 12.0 | 90 | | | | 7 | 0.3 | | 3 | | | |
| 54 | 5.4 | 69 | 2 | 20 | 2 | 1 | | | | | 3 | 3 |
| 56 | 6.0 | 91 | | | 4 | | | | | | 5 | |

TABLE 8

| Dye | Dye Content | Water | PG | DEG | NMP | CET | TBT | TDG | BDL | PHO | 2P | P12 |
|---|---|---|---|---|---|---|---|---|---|---|---|---|
| 10 | 3.0 | 80 | 15 | | | 0.2 | | | | | 5 | |
| 12 | 9.0 | 90 | | 5 | | | | | | 1.2 | | 5 |
| 13 | 1.5 | 85 | 5 | 5 | | 0.15 | 5.0 | 0.2 | | | | |
| 19 | 2.5 | 90 | | 6 | 4 | | | | | 0.12 | | |
| 20 | 3.1 | 82 | 4 | 8 | | 0.3 | | | | | | 6 |
| 21 | 0.9 | 85 | | 10 | | | | | 5 | 0.2 | | |
| 30 | 8.0 | 90 | | 5 | 5 | | | 0.3 | | | | |
| 47 | 4.0 | 70 | | 10 | 4 | | | | 1 | | 4 | 11 |
| 48 | 2.2 | 75 | 4 | 10 | 3 | | | | 2 | 6 | | |
| 50 | 10.0 | 91 | | | 6 | | | | | 3 | | |
| 51 | 9.0 | 76 | | 9 | 7 | | 3.0 | | | 0.95 | 5 | |
| 53 | 5.0 | 78 | 5 | 11 | | | | | | 6 | | |
| 62 | 5.4 | 86 | | | 7 | | | | | | 7 | |
| 1 | 2.1 | 70 | 5 | 5 | 5 | 0.1 | 0.2 | 0.1 | 5 | 0.1 | 5 | |
| 11 | 2.0 | 90 | | 10 | | | | | | | | |
| 14 | 2 | 88 | | | | | | 10 | | | | |
| 15 | 5 | 78 | | | 5 | | | 12 | | | 5 | |
| 60 | 8 | 70 | 2 | | 8 | | | 15 | | | 5 | |
| 54 | 10 | 80 | | | | | | | 8 | | 12 | |
| 56 | 10 | 80 | | 10 | | | | | | | | |

EXAMPLE 64

Ink-jet Printing

A selection of the inks described in Example 67 were incorporated into an empty cartridge of Hewlett Packard DeskJet 560C™ ink jet printer and printed onto a variety of media for example: HP printing paper, HP Premium Plus Photo Paper, Canon Photo Paper Pro (PR101) or Seiko Epson Premium Glossy Photo Paper. Two commonly used commercial dyes were also printed as controls, the structures of which are shown below:

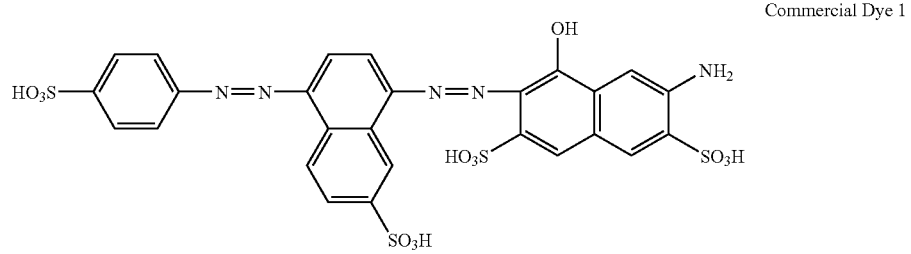

Commercial Dye 1

Commercial Dye 2

A blend of the following molecules:

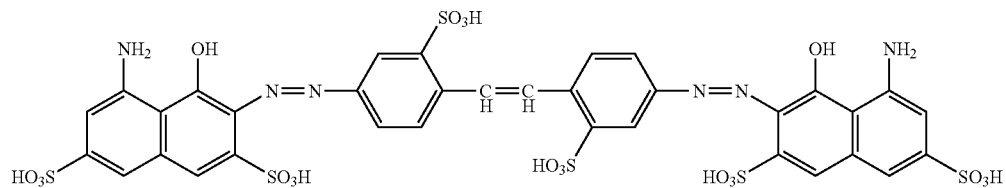

+

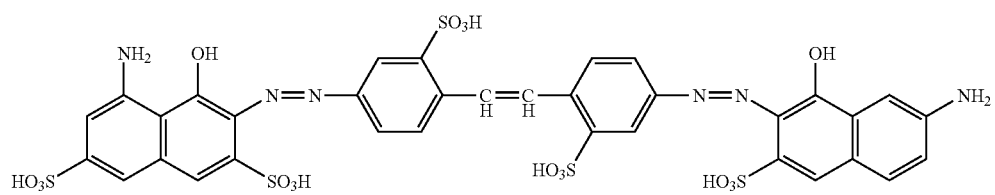

+

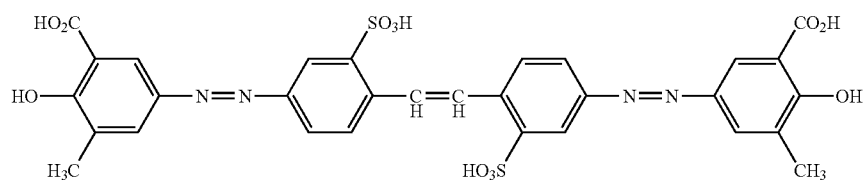

The optical density readings of each print were measured using a Gretag Macbeth with no filter, D65 illuminant with a 2° (CIE 1931) observer angle and a density operation of ANSI status A. The optical density results are shown in Table 9.

TABLE 9

| DYE | SUBSTRATE | ROD |
| --- | --- | --- |
| 3 | CANON PR101 | 1.70 |
| 9 | CANON PR101 | 1.73 |
| 12 | CANON PR101 | 2.04 |
| 21 | CANON PR101 | 1.96 |
| 51 | CANON PR101 | 1.91 |
| 53 | CANON PR101 | 1.72 |
| Commercial Dye 1 | CANON PR101 | 1.47 |
| Commercial Dye 2 | CANON PR101 | 1.65 |
| 6 | EPSON PREMIUM GLOSSY PHOTO | 2.01 |
| 3 | EPSON PREMIUM GLOSSY PHOTO | 1.86 |
| 9 | EPSON PREMIUM GLOSSY PHOTO | 1.82 |
| 10 | EPSON PREMIUM GLOSSY PHOTO | 2.20 |
| 12 | EPSON PREMIUM GLOSSY PHOTO | 2.02 |
| 21 | EPSON PREMIUM GLOSSY PHOTO | 2.07 |
| 48 | EPSON PREMIUM GLOSSY PHOTO | 1.93 |
| 51 | EPSON PREMIUM GLOSSY PHOTO | 2.18 |

TABLE 9-continued

| DYE | SUBSTRATE | ROD |
| --- | --- | --- |
| Commercial Dye 1 | EPSON PREMIUM GLOSSY PHOTO | 1.63 |
| Commercial Dye 2 | EPSON PREMIUM GLOSSY PHOTO | 1.81 |
| 10 | HP PREMIUM PLUS | 1.76 |
| 51 | HP PREMIUM PLUS | 1.80 |
| Commercial Dye 1 | HP PREMIUM PLUS | 1.48 |
| Commercial Dye 2 | HP PREMIUM PLUS | 1.56 |

Light Fastness

The light fastness of the prints was assessed using an Atlas Ci5000 Weather-o-meter running an Atlas 12000 W Xenon Lamp at 0.8 W/m$^2$ at 420 nm. The black panel temperature was controlled to 63° C. at 50% relative humidity and borosilicate and soda lime filters were employed. The prints were exposed for 100 hours and then re-measured using the Greta Macbeth set to the conditions described above. Light fastness results are displayed in Table 10.

TABLE 10

| DYE | SUBSTRATE | TEST | Delta E | ROD Loss % |
|---|---|---|---|---|
| 6 | CANON PR101 | LF 100H | 6.0 | 14.3 |
| 3 | CANON PR101 | LF 100H | 5.0 | 10.6 |
| 4 | CANON PR101 | LF 100H | 7.1 | 13.5 |
| 5 | CANON PR101 | LF 100H | 5.2 | 9.2 |
| 9 | CANON PR101 | LF 100H | 5.6 | 11.6 |
| 10 | CANON PR101 | LF 100H | 6.4 | 13.1 |
| 11 | CANON PR101 | LF 100H | 6.7 | 13.5 |
| 12 | CANON PR101 | LF 100H | 3.7 | 6.4 |
| 13 | CANON PR101 | LF 100H | 3.8 | 7.3 |
| 19 | CANON PR101 | LF 100H | 5.0 | 10.1 |
| 21 | CANON PR101 | LF 100H | 6.3 | 11.2 |
| 26 | CANON PR101 | LF 100H | 4.7 | 7.6 |
| 30 | CANON PR101 | LF 100H | 7.3 | 16.0 |
| 48 | CANON PR101 | LF 100H | 7.7 | 16.3 |
| 50 | CANON PR101 | LF 100H | 5.6 | 10.9 |
| 51 | CANON PR101 | LF 100H | 3.8 | 6.8 |
| 60 | CANON PR101 | LF 100H | 5.8 | 8.0 |
| 61 | CANON PR101 | LF 100H | 7.3 | 11.3 |
| Commercial Dye 1 | CANON PR101 | LF 100H | 13.1 | 22.4 |
| Commercial Dye 2 | CANON PR101 | LF 100H | 68.0 | 72.1 |
| 1 | EPSON PREMIUM GLOSSY PHOTO | LF 100H | 3.3 | 5.7 |
| 6 | EPSON PREMIUM GLOSSY PHOTO | LF 100H | 1.9 | 2.0 |
| 3 | EPSON PREMIUM GLOSSY PHOTO | LF 100H | 1.4 | 3.2 |
| 4 | EPSON PREMIUM GLOSSY PHOTO | LF 100H | 2.7 | 5.4 |
| 9 | EPSON PREMIUM GLOSSY PHOTO | LF 100H | 2.0 | 4.9 |
| 10 | EPSON PREMIUM GLOSSY PHOTO | LF 100H | 3.5 | 8.6 |
| 11 | EPSON PREMIUM GLOSSY PHOTO | LF 100H | 1.6 | 4.3 |
| 13 | EPSON PREMIUM GLOSSY PHOTO | LF 100H | 1.6 | 3.4 |
| 19 | EPSON PREMIUM GLOSSY PHOTO | LF 100H | 2.6 | 3.6 |
| 21 | EPSON PREMIUM GLOSSY PHOTO | LF 100H | 3.7 | 1.0 |
| 26 | EPSON PREMIUM GLOSSY PHOTO | LF 100H | 3.2 | 2.2 |
| 30 | EPSON PREMIUM GLOSSY PHOTO | LF 100H | 2.5 | 5.7 |
| 31 | EPSON PREMIUM GLOSSY PHOTO | LF 100H | 3.1 | 6.5 |
| 43 | EPSON PREMIUM GLOSSY PHOTO | LF 100H | 3.2 | 6.6 |
| 47 | EPSON PREMIUM GLOSSY PHOTO | LF 100H | 1.7 | 0.0 |
| 50 | EPSON PREMIUM GLOSSY PHOTO | LF 100H | 4.0 | 0.0 |
| 51 | EPSON PREMIUM GLOSSY PHOTO | LF 100H | 2.3 | 6.4 |
| 61 | EPSON PREMIUM GLOSSY PHOTO | LF 100H | 1.8 | 2.5 |
| Commercial Dye 1 | EPSON PREMIUM GLOSSY PHOTO | LF 100H | 4.1 | 9.2 |
| Commercial Dye 2 | EPSON PREMIUM GLOSSY PHOTO | LF 100H | 52.2 | 61.3 |
| 6 | HP PREMIUM PLUS | LF 100H | 5.8 | 12.1 |
| 4 | HP PREMIUM PLUS | LF 100H | 6.9 | 2.9 |
| 9 | HP PREMIUM PLUS | LF 100H | 4.7 | 4.2 |
| 10 | HP PREMIUM PLUS | LF 100H | 6.6 | 5.1 |
| 12 | HP PREMIUM PLUS | LF 100H | 2.6 | 2.0 |
| 30 | HP PREMIUM PLUS | LF 100H | 7.5 | 5.1 |
| 47 | HP PREMIUM PLUS | LF 100H | 6.0 | 3.6 |
| 48 | HP PREMIUM PLUS | LF 100H | 4.5 | 7.3 |
| 50 | HP PREMIUM PLUS | LF 100H | 6.0 | 8.4 |
| 51 | HP PREMIUM PLUS | LF 100H | 5.9 | 6.7 |
| 60 | HP PREMIUM PLUS | LF 100H | 6.4 | 11.4 |
| 61 | HP PREMIUM PLUS | LF 100H | 4.9 | 5.4 |
| Commercial Dye 1 | HP PREMIUM PLUS | LF 100H | 9.6 | 18.2 |
| Commercial Dye 2 | HP PREMIUM PLUS | LF 100H | 50.7 | 65.4 |

Ozone Fastness

The ozone fastness of the prints was assessed following exposure to an ozone concentration of 1 ppm for 24 hours using a Hampden Model 903 Ozone Test Cabinet at a temperature of 40° C. and relative humidity of 50%. The ozone fastness results are displayed in Table 11.

TABLE 11

| DYE | SUBSTRATE | TEST | Delta E | ROD Loss % |
|---|---|---|---|---|
| 3 | CANON PR101 | OF 1PPM/24H | 4.4 | 7.6 |
| 4 | CANON PR101 | OF 1PPM/24H | 6.0 | 10.9 |
| 5 | CANON PR101 | OF 1PPM/24H | 6.3 | 10.5 |
| 9 | CANON PR101 | OF 1PPM/24H | 5.2 | 8.7 |
| 11 | CANON PR101 | OF 1PPM/24H | 5.6 | 11.5 |
| 12 | CANON PR101 | OF 1PPM/24H | 10.9 | 19.6 |
| 13 | CANON PR101 | OF 1PPM/24H | 4.1 | 8.9 |
| 19 | CANON PR101 | OF 1PPM/24H | 4.6 | 6.9 |

TABLE 11-continued

| DYE | SUBSTRATE | TEST | Delta E | ROD Loss % |
|---|---|---|---|---|
| 20 | CANON PR101 | OF 1PPM/24H | 0.9 | 1.5 |
| 21 | CANON PR101 | OF 1PPM/24H | 6.8 | 11.7 |
| 26 | CANON PR101 | OF 1PPM/24H | 7.1 | 12.3 |
| 30 | CANON PR101 | OF 1PPM/24H | 7.1 | 13.7 |
| 31 | CANON PR101 | OF 1PPM/24H | 6.7 | 14.4 |
| 34 | CANON PR101 | OF 1PPM/24H | 6.0 | 11.1 |
| 47 | CANON PR101 | OF 1PPM/24H | 6.5 | 8.9 |
| 48 | CANON PR101 | OF 1PPM/24H | 6.8 | 11.6 |
| 50 | CANON PR101 | OF 1PPM/24H | 4.0 | 6.9 |
| 51 | CANON PR101 | OF 1PPM/24H | 3.0 | 4.7 |
| 53 | CANON PR101 | OF 1PPM/24H | 1.0 | 1.2 |
| 61 | CANON PR101 | OF 1PPM/24H | 7.5 | 14.3 |
| Commercial Dye 1 | CANON PR101 | OF 1PPM/24H | 41.1 | 46.9 |
| Commercial Dye 2 | CANON PR101 | OF 1PPM/24H | 53.6 | 67.3 |
| 1 | EPSON PREMIUM GLOSSY PHOTO | OF 1PPM/24H | 2.4 | 1.0 |
| 3 | EPSON PREMIUM GLOSSY PHOTO | OF 1PPM/24H | 3.6 | 5.4 |
| 5 | EPSON PREMIUM GLOSSY PHOTO | OF 1PPM/24H | 2.3 | 4.0 |
| 9 | EPSON PREMIUM GLOSSY PHOTO | OF 1PPM/24H | 3.8 | 6.0 |
| 10 | EPSON PREMIUM GLOSSY PHOTO | OF 1PPM/24H | 1.4 | 2.7 |
| 11 | EPSON PREMIUM GLOSSY PHOTO | OF 1PPM/24H | 2.2 | 3.9 |
| 12 | EPSON PREMIUM GLOSSY PHOTO | OF 1PPM/24H | 9.9 | 13.4 |
| 13 | EPSON PREMIUM GLOSSY PHOTO | OF 1PPM/24H | 2.9 | 5.8 |
| 19 | EPSON PREMIUM GLOSSY PHOTO | OF 1PPM/24H | 2.2 | 2.5 |
| 21 | EPSON PREMIUM GLOSSY PHOTO | OF 1PPM/24H | 4.2 | 6.8 |
| 30 | EPSON PREMIUM GLOSSY PHOTO | OF 1PPM/24H | 4.6 | 8.9 |
| 31 | EPSON PREMIUM GLOSSY PHOTO | OF 1PPM/24H | 3.5 | 6.0 |
| 34 | EPSON PREMIUM GLOSSY PHOTO | OF 1PPM/24H | 7.9 | 10.5 |
| 39 | EPSON PREMIUM GLOSSY PHOTO | OF 1PPM/24H | 3.1 | 5.6 |
| 43 | EPSON PREMIUM GLOSSY PHOTO | OF 1PPM/24H | 3.4 | 6.0 |
| 48 | EPSON PREMIUM GLOSSY PHOTO | OF 1PPM/24H | 2.7 | 5.2 |
| 50 | EPSON PREMIUM GLOSSY PHOTO | OF 1PPM/24H | 1.5 | 2.1 |
| 53 | EPSON PREMIUM GLOSSY PHOTO | OF 1PPM/24H | 1.3 | 3.0 |
| 61 | EPSON PREMIUM GLOSSY PHOTO | OF 1PPM/24H | 3.0 | 4.0 |
| Commercial Dye 1 | EPSON PREMIUM GLOSSY PHOTO | OF 1PPM/24H | 38.6 | 35.6 |
| Commercial Dye 2 | EPSON PREMIUM GLOSSY PHOTO | OF 1PPM/24H | 65.2 | 74.0 |

There, it can be seen from the above results that the dyes of the present invention when incorporated in inks and printed using an ink jet printer onto various media produce prints having overall excellent optical density, light fastness and ozone fastness when compared with commercially available dyes.

The invention claimed is:

1. A compound of Formula (1) or salt thereof:

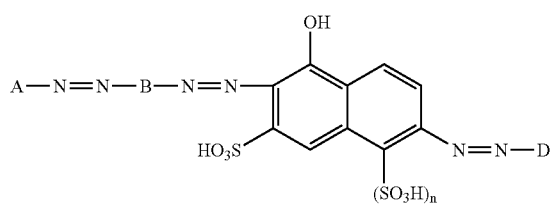

Formula (1)

wherein:
  A is phenyl carrying one to three substituents selected from carboxy, sulpho, phosphato, amino, optionally substituted $C_{1-6}$alkyl, optionally substituted $C_{1-6}$alkoxy, acetamido, nitro and N-oxamoyl;
  B is phenylene or naphthylene carrying one or two substituents selected from sulpho, methyl, methoxy, acetamido, amino and 2-hydroxethoxy;
  n is 0 or 1; and
  D is of Formula (3a), (3b) or (3c);

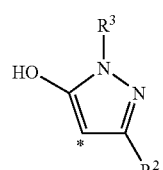

Formula (3a)

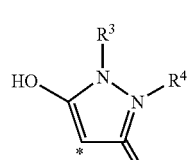

Formula (3b)

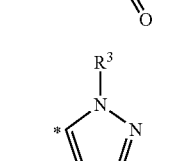

Formula (3c)

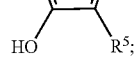

wherein
  $R^2$ and $R^5$ are each independently H, carboxy, cyano or optionally substituted alkyl, alkoxy, acyl, aryl, amino, amido, carbonamido, carboxyester, sulphamoyl or alkylsulphonyl; and
  $R^3$ and $R^4$ are each independently H or optionally substituted aryl or alkyl; and
  * shows the point of attachment to the azo linkage in Formula (1).

2. A compound according to claim 1 wherein D is a pyrazolyl group carrying at least one carboxy, sulpho or phosphato acid group.

3. A compound according to claim 1 wherein B is phenylene carrying one or two substituents as defined.

4. A compound according to claim 1, wherein:
  A is phenyl carrying one or two substituents selected from carboxy, sulpho, phosphate, amino, methyl, methoxy and acetamido;
  B is phenylene or naphthylene carrying one or two substituents selected from sulpho, methyl, methoxy and 2-hydroxyethoxy;
  n is 0 or 1;
  D is of Formula (3a),(3b) or (3c); wherein:

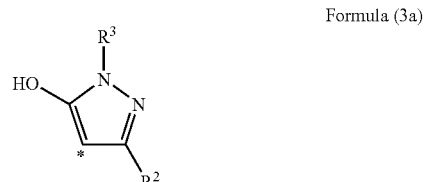

Formula (3a)

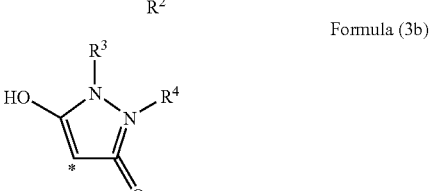

Formula (3b)

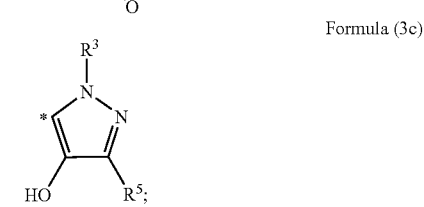

Formula (3c)

$R^2$ is H, methyl or carboxy;
  $R^3$ and $R^4$ are each independently phenyl or naphthyl carrying one or two substituents selected from sulpho and carboxy; and
  $R^5$ is a $C_{1-4}$alkylcarboxyester.

5. A compound according to claim 1 wherein:
  A is phenyl carrying one or two substituents selected from carboxy, sulpho, amino, methyl, methoxy and acetamido;
  B is phenylene or naphthylene carrying one or two substituents selected from sulpho, methyl, methoxy and 2-hydroxyethoxy;
  n is 0 or 1;
  D is of Formula (3a), (3b) or (3c):

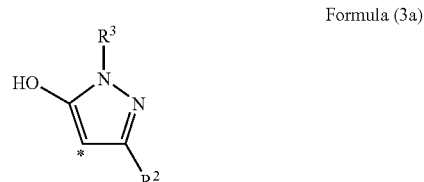

Formula (3a)

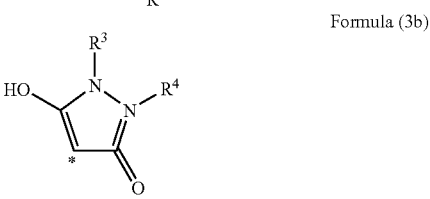

Formula (3b)

-continued

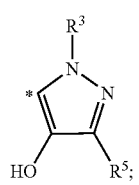

Formula (3c)

wherein:

R² and R⁵ are each independently H, carboxy, cyano or optionally substituted alkyl, alkoxy, acyl, aryl, amino, amido, carbonamido, carboxyester, sulphamoyl or alkylsulphonyl; and R³ and R⁴ are each independently H or optionally substituted aryl or alkyl; and \* shows the point of attachment to the azo linkage in Formula (1).

6. A composition which comprises:
 a compound of Formula (1) as defined in claim 1; and
 a liquid medium,
 wherein the liquid medium comprises water and an organic solvent.

7. A composition according to claim 6 which further comprises an additional colorant selected from black, magenta, cyan or yellow colorants.

8. A process for printing an image on a substrate comprising applying thereto a composition according to claims 6 or 7 by means of an ink jet printer.

9. A paper, an overhead projector slide or a textile material printed with a composition according to claims 6 or 7.

10. An optionally refillable ink jet printer cartridge, comprising one or more chambers and a composition according to claim 6 or 7 present in at least one of the chambers.

11. A paper, an overhead projector slide or a textile material printed with a compound according to claim 1.

12. A paper, an overhead projector slide or a textile material printed by a process according to claim 8.

13. A compound according to claim 1 having the formula:

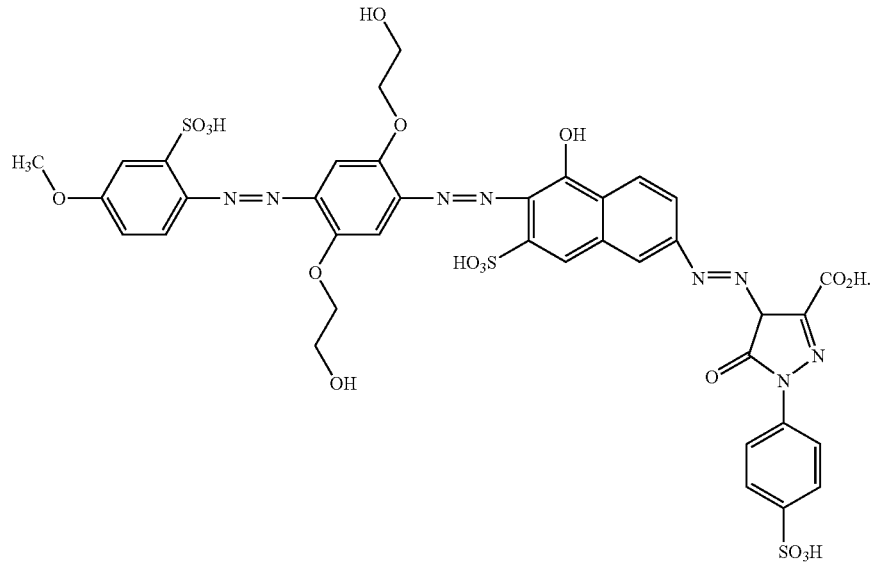

\* \* \* \* \*